United States Patent
Ma et al.

(10) Patent No.: US 11,431,583 B2
(45) Date of Patent: Aug. 30, 2022

(54) PERSONALIZED TAILORED AIR INTERFACE

(71) Applicants: Jianglei Ma, Ottawa (CA); Peiying Zhu, Ottawa (CA); Wen Tong, Ottawa (CA); Ming Jia, Ottawa (CA)

(72) Inventors: Jianglei Ma, Ottawa (CA); Peiying Zhu, Ottawa (CA); Wen Tong, Ottawa (CA); Ming Jia, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 19 days.

(21) Appl. No.: 16/854,329

(22) Filed: Apr. 21, 2020

(65) Prior Publication Data

US 2021/0160149 A1 May 27, 2021

Related U.S. Application Data

(60) Provisional application No. 62/939,284, filed on Nov. 22, 2019.

(51) Int. Cl.

| | |
|---|---|
| *H04L 41/16* | (2022.01) |
| *H04L 41/0823* | (2022.01) |
| *H04W 28/06* | (2009.01) |
| *H04W 72/04* | (2009.01) |
| *H04W 92/10* | (2009.01) |
| *H04W 76/10* | (2018.01) |
| *H04W 28/26* | (2009.01) |

(Continued)

(52) U.S. Cl.
CPC .......... *H04L 41/16* (2013.01); *H04L 41/0803* (2013.01); *H04L 41/0823* (2013.01); *H04W 28/0205* (2013.01); *H04W 28/06* (2013.01); *H04W 28/18* (2013.01); *H04W 28/26* (2013.01); *H04W 72/0406* (2013.01); *H04W 72/1278* (2013.01); *H04W 76/10* (2018.02); *H04W 76/20* (2018.02); *H04W 92/10* (2013.01); *H04L 47/14* (2013.01)

(58) Field of Classification Search
CPC . H04W 28/18; H04W 28/26; H04W 28/0205; H04W 28/06; H04W 28/20; H04W 28/22; H04W 28/24; H04W 72/1278; H04W 72/0406; H04W 76/10; H04W 76/20; H04W 92/10; H04L 41/0803; H04L 41/16; H04L 41/0823; H04L 41/0816; H04L 47/14

See application file for complete search history.

(56) References Cited

U.S. PATENT DOCUMENTS

| | | |
|---|---|---|
| 10,314,051 B1 | 6/2019 | Oroskar et al. |
| 2014/0016570 A1* | 1/2014 | Ma ............. H04L 1/1825 370/329 |

(Continued)

FOREIGN PATENT DOCUMENTS

| | | | |
|---|---|---|---|
| WO | 2019029510 A1 | 2/2019 | |
| WO | WO-2021063500 A1 * | 4/2021 | ............. H04W 4/20 |

*Primary Examiner* — Joshua Kading

(57) ABSTRACT

Methods and devices utilizing artificial intelligence (AI) or machine learning (ML) for customization of a device specific air interface configuration in a wireless communication network are provided. An over the air information exchange to facilitate the training of one or more AI/ML modules involves the exchange of AI/ML capability information identifying whether a device supports AI/ML for optimization of the air interface.

21 Claims, 16 Drawing Sheets

(51) Int. Cl.
*H04W 28/18* (2009.01)
*H04W 72/12* (2009.01)
*H04W 28/02* (2009.01)
*H04L 41/0803* (2022.01)
*H04W 76/20* (2018.01)

(56) References Cited

U.S. PATENT DOCUMENTS

| | | |
|---|---|---|
| 2017/0208455 A1 | 7/2017 | Au et al. |
| 2018/0352504 A1 | 12/2018 | Ma et al. |
| 2018/0367382 A1 | 12/2018 | Zhang et al. |
| 2019/0385608 A1* | 12/2019 | Lee .................... G10L 21/0316 |
| 2020/0336344 A1* | 10/2020 | Govea .................. G06N 3/0454 |
| 2020/0367051 A1* | 11/2020 | Wang .................... H04W 8/245 |
| 2021/0126737 A1* | 4/2021 | Zhang ................. H04W 72/042 |

* cited by examiner

PERSONALIZED TAILORED AIR INTERFACE

CROSS-REFERENCE TO RELATED APPLICATION

This application claims the benefit of U.S. Provisional Patent Application No. 62/939,284 entitled "PERSONALIZED TAILORED AIR INTERFACE" filed Nov. 22, 2019, the entire contents of which is incorporated herein by reference.

FIELD

The present disclosure relates to wireless communication generally, and, in particular embodiments, to methods and apparatuses for air interface customization.

BACKGROUND

An air interface is the wireless communications link between two or more communicating devices, such as an evolved NodeB (also commonly referred to as a NodeB, a base station, NR base station, a transmit point, a remote radio head, a communications controller, a controller, and the like) and a user equipment (UE) (also commonly referred to as a mobile station, a subscriber, a user, a terminal, a phone, and the like). Typically, both communicating devices need to know the air interface in order to successfully transmit and receive a transmission.

In many wireless communication systems, the air interface definition is a one-size-fits-all concept. The components within the air interface cannot be changed or adapted once the air interface is defined. In some implementations, only limited parameters or modes of an air interface, such as a cyclic prefix (CP) length or multiple input multiple output (MIMO) mode, can be configured. In some modern wireless systems, a configurable air interface concept has been adopted to provide a framework for a more flexible air interface. It is intended to provide adaptation of different components within the air interface, and to address the potential requirements of future applications. Some modern wireless systems, such as fifth generation (5G) or new radio (NR) network systems, support network slicing, which is a network architecture that enables the multiplexing of virtualized and independent logical networks on the same physical network infrastructure. In such systems, each network slice is an isolated end-to-end network tailored to fulfill diverse requirements requested by a particular service or application. A configurable air interface has been proposed for NR networks that allows for service or slice based optimization of the air interface to allow the air interface to be configured based on a service or application that will be supported by the air interface or the network slice over which the service or application will be provided.

SUMMARY

Different pairs of communicating devices (i.e., a transmission sending device and a transmission receiving device) may have different transmission capabilities and/or transmission requirements. The different transmission capabilities and/or transmission requirements typically cannot be met optimally by a single air interface or air interface configuration.

The configurable air interface proposed for NR networks allows service or slice based optimization based on selecting from a predetermined subset of parameters or technologies for a predetermined subset of air interface components. If the service and/or network slice over which the service is provided changes, the configurations of the components of the transmit and receive chains of the communicating devices may be changed to match a new predetermined service or slice specific air interface corresponding to the new service or network slice.

However for each service, the transmission condition, capability and requirements can still be quite different for each device, which means, for example, that an air interface configuration that may be optimal for delivering a service to one device, for an example one UE, may not necessarily be optimal for delivering the same service to another UE.

The present disclosure provides methods and apparatuses that may be used to implement new air interfaces for wireless communication that are tailored or personalized on a device-specific basis, for example using artificial intelligence and/or machine learning to provide device-specific air interface optimization. For example, embodiments of the present disclosure include new air interfaces that go beyond a network slice/service specific air interface to a personalized tailored air interface that includes a personalized service type and a personalized air interface setting. Thus, using artificial intelligence and/or machine learning to optimize a device-specific air interface, can achieve a new air interface configuration to satisfy the requirement of each UE on an individual basis.

One broad aspect of the present disclosure provides a method in a wireless communication network in which a first device transmits information regarding an artificial intelligence or machine learning (AI/ML) capability of the first device to a second device over an air interface between the first device and the second device. For example, the information regarding an AI/ML capability of the first device may identify whether the first device supports AI/ML for optimization of at least one air interface component over the air interface. Thus, the exchange of AI/ML capability between two communicating devices is used to optimize one or more air interface components to accomplish device-specific air interface optimization.

Another broad aspect of the present disclosure provides a method in a wireless communication network in which a second device receives information regarding an artificial intelligence or machine learning (AI/ML) capability of a first device over an air interface between the first device and the second device. For example, the information regarding an AI/ML capability of the first device may identify whether the first device supports AI/ML for optimization of at least one air interface component over the air interface. In some embodiments, the second device may transmit an AI/ML training request to the first device based at least in part on the information regarding the AI/ML capability of the first device. Thus, the exchange of AI/ML capability between two communicating devices is used to optimize one or more air interface components to accomplish device-specific air interface optimization.

Yet another broad aspect of the present disclosure provides an apparatus that includes at least one processor and a computer readable storage medium operatively coupled to the at least one processor. The computer readable storage medium stores programming for execution by the at least one processor. The programming includes instructions to transmit, from the apparatus, information regarding an artificial intelligence or machine learning (AI/ML) capability of the apparatus to a network device over an air interface between the apparatus and the network device. For example, the information regarding an AI/ML capability of the apparatus may identify whether the apparatus supports AI/ML for optimization of at least one air interface component over the air interface.

Still another broad aspect of the present disclosure provides a network apparatus that includes at least one processor and a computer readable storage medium operatively coupled to the at least one processor. The computer readable storage medium stores programming for execution by the at least one processor. The programming includes instructions to receive, by the network apparatus, information regarding an artificial intelligence or machine learning (AI/ML) capability of a first device over an air interface between the first device and the network apparatus. For example, the information regarding an AI/ML capability of the first device may identify whether the first device supports AI/ML for optimization of at least one air interface component over the air interface. In some embodiment, the programming further comprises instructions to transmit an AI/ML training request to the first device based at least in part on the information regarding the AI/ML capability of the first device.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

To assist in understanding the present disclosure, an example wireless communication system is described below.

Figure 1:
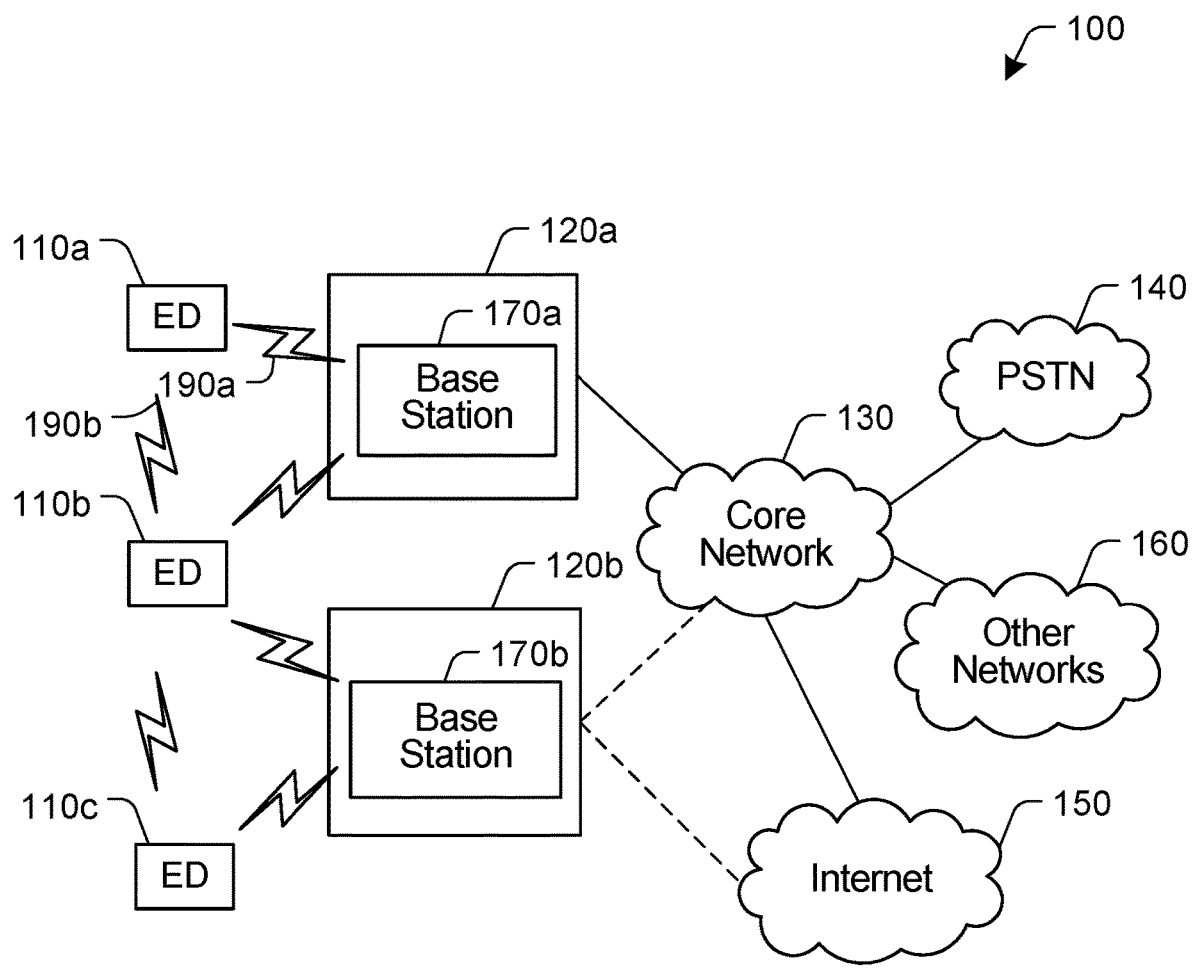
FIG. 1 is a schematic diagram of an example communication system suitable for implementing examples described herein.

FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated (e.g., via broadcast, narrowcast, user device to user device, etc.) among entities of the system 100. The wireless system 100 may operate by sharing resources such as bandwidth. The wireless system 100 may be suitable for wireless communications using 5G technology and/or later generation wireless technology (e.g., 6G or later). In some examples, the wireless system 100 may also accommodate some legacy wireless technology (e.g., 3G or 4G wireless technology).

In the example shown, the wireless system 100 includes electronic devices (ED) 110a-110c (generically referred to as ED 110), radio access networks (RANs) 120a-120b (generically referred to as RAN 120), a core network 130, a public switched telephone network (PSTN) 140, the internet 150, and other networks 160. In some examples, one or more of the networks may be omitted or replaced by a different type of network. Other networks may be included in the wireless system 100. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 may be configured to transmit, receive, or both via wireless or wired communication channels. Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, or a consumer electronics device, among other possibilities. Future generation EDs 110 may be referred to using other terms.

In FIG. 1, the RANs 120 include base stations (BSs) 170*a*-170*b* (generically referred to as BS 170), respectively. Each BS 170 is configured to wirelessly interface with one or more of the EDs 110 to enable access to any other BS 170, the core network 130, the PSTN 140, the internet 150, and/or the other networks 160. For example, the BS 170*s* may include (or be) one or more of several well-known devices, such as a base transceiver station (BTS), a radio base station, a Node-B (NodeB), an evolved NodeB (eNodeB), a Home eNodeB, a gNodeB (sometimes called a next-generation Node B), a transmission point (TP), a transmit and receive point (TRP), a site controller, an access point (AP), or a wireless router, among other possibilities. Future generation BSs 170 may be referred to using other terms. Any ED 110 may be alternatively or additionally configured to interface, access, or communicate with any other BS 170, the internet 150, the core network 130, the PSTN 140, the other networks 160, or any combination of the preceding. The wireless system 100 may include RANs, such as RAN 120*b*, wherein the corresponding BS 170*b* accesses the core network 130 via the internet 150, as shown.

The EDs 110 and BSs 170 are examples of communication equipment that can be configured to implement some or all of the functionality and/or embodiments described herein. In the embodiment shown in FIG. 1, the BS 170*a* forms part of the RAN 120*a*, which may include other BSs, base station controller(s) (BSC), radio network controller(s) (RNC), relay nodes, elements, and/or devices. Any BS 170 may be a single element, as shown, or multiple elements, distributed in the corresponding RAN, or otherwise. Also, the BS 170*b* forms part of the RAN 120*b*, which may include other BSs, elements, and/or devices. Each BS 170 transmits and/or receives wireless signals within a particular geographic region or area, sometimes referred to as a "cell" or "coverage area". A cell may be further divided into cell sectors, and a BS 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of RANs 120 shown is exemplary only. Any number of RANs may be contemplated when devising the wireless system 100.

The BSs 170 communicate with one or more of the EDs 110 over one or more air interfaces 190*a* using wireless communication links (e.g. radio frequency (RF), microwave, infrared (IR), etc.). The EDs 110 may also communicate directly with one another via one or more sidelink air interfaces 190*b*. The interfaces 190*a* and 190*b* may be generally referred to as air interfaces 190. BS-ED communications over interfaces 190*a* and ED-ED communications over interfaces 190*b* may use similar communication technology. The air interfaces 190 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190. The air interfaces 190 may utilize other higher dimension signal spaces, which may involve a combine of orthogonal and/or non-orthogonal dimensions.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120 or EDs 110 or both, and (ii) other networks (such as the PSTN 140, the internet 150, and the other networks 160). In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110 may be multimode devices capable of operation according to multiple radio access technologies, and incorporate multiple transceivers necessary to support such.

Figure 2:
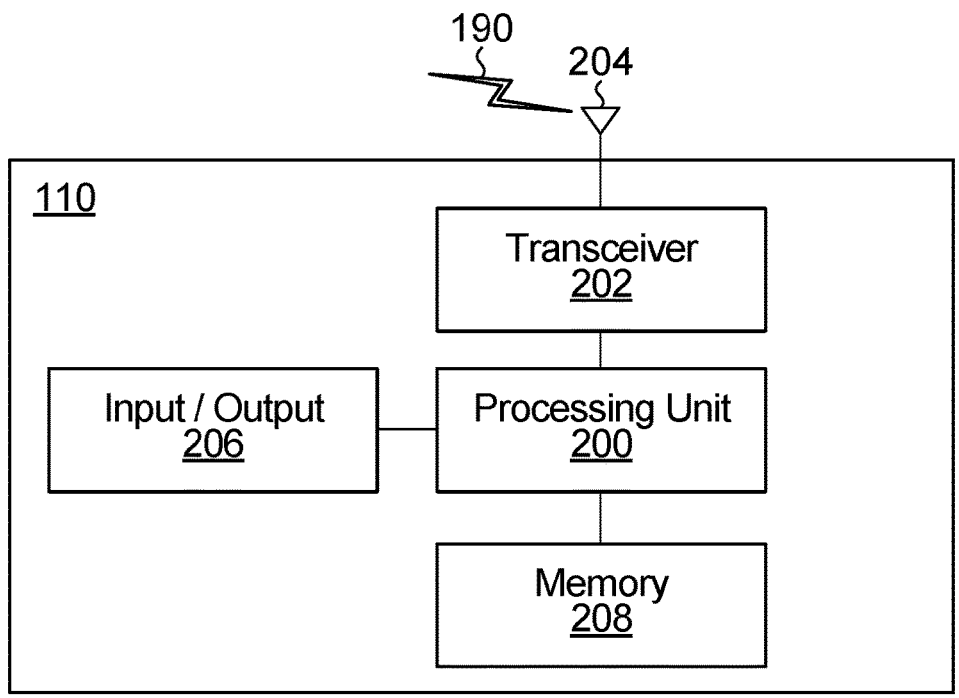
FIGS. 2 and 3 are block diagrams illustrating example devices that may implement the methods and teachings according to this disclosure.
Figure 3:
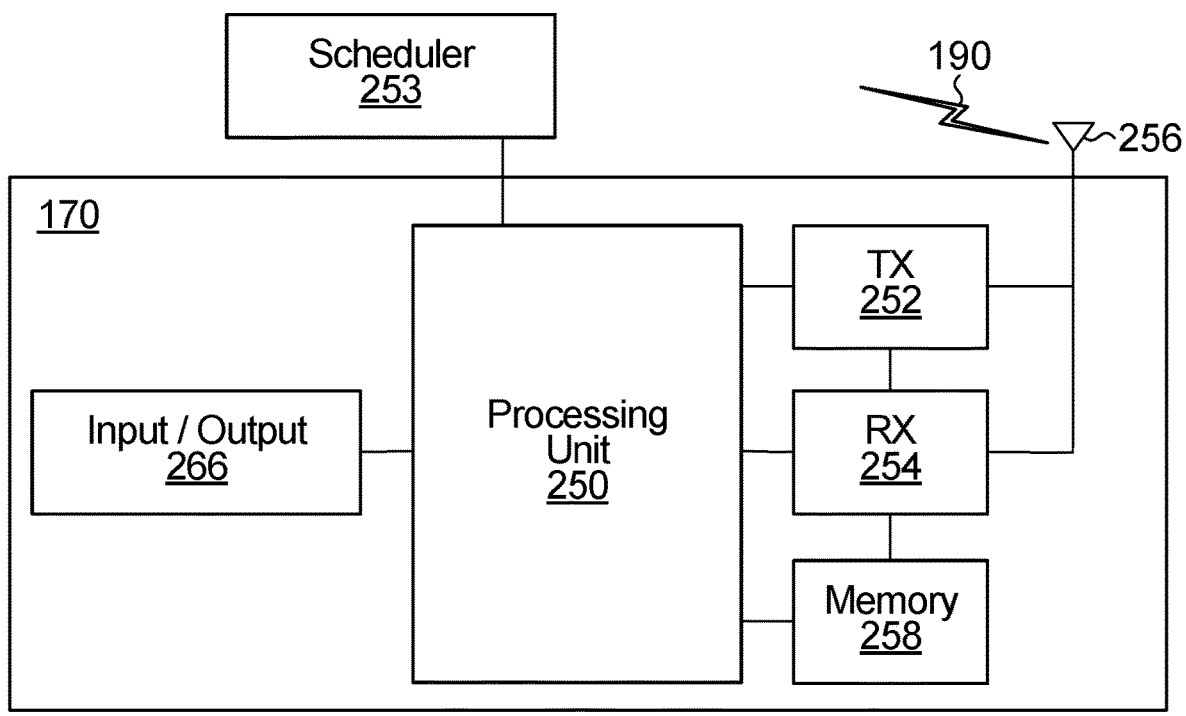

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail elsewhere herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150 in FIG. 1). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 1350, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110 in FIG. 2. The memory 258 stores instructions and data used, generated, or collected by the base station 170. For example, the memory 258 could store software instructions or modules configured to implement some or all of the functionality and/or embodiments described herein and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
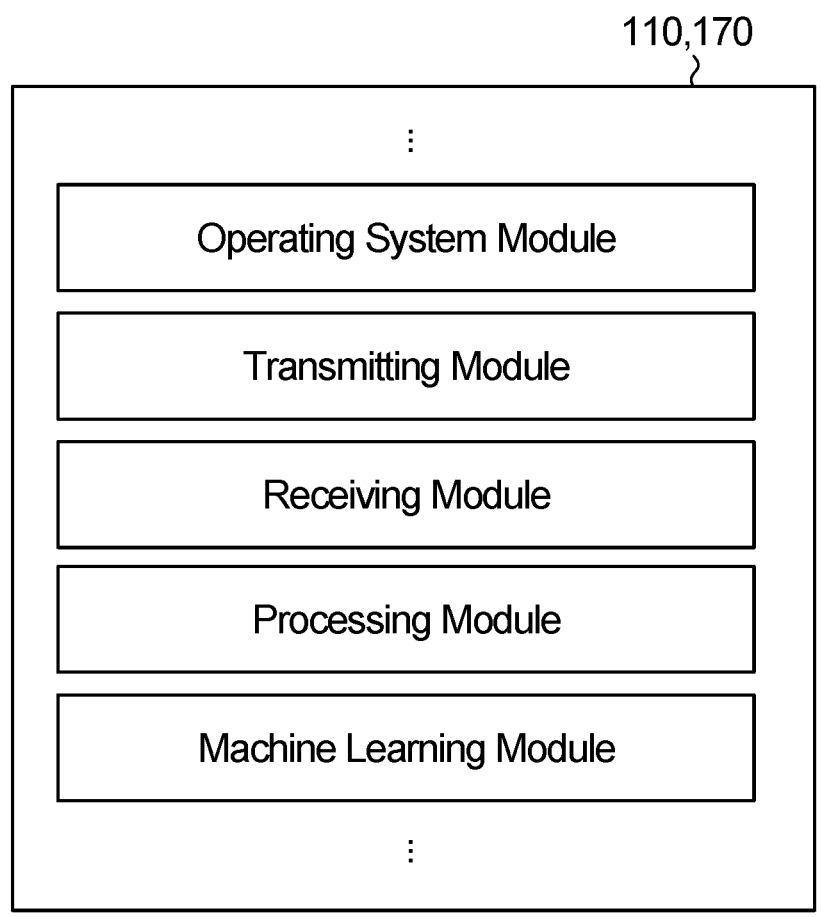
FIG. 4 is a block diagram of an example computing system that may implement the methods and teachings according to this disclosure.

It should be appreciated that one or more steps of the embodiment methods provided herein may be performed by corresponding units or modules, according to FIG. 4. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs such as 110 and base stations such as 170 are known to those of skill in the art. As such, these details are omitted here.

Referring back to FIG. 1, different pairs of communicating devices (i.e., a transmission sending device and a transmission receiving device), such as ED 110a communicating with BS 170a or ED 110b communicating with BS 170a, may have different transmission capabilities and/or transmission requirements. The different transmission capabilities and/or transmission requirements typically cannot be met optimally by a single air interface or air interface configuration.

Figure 5:
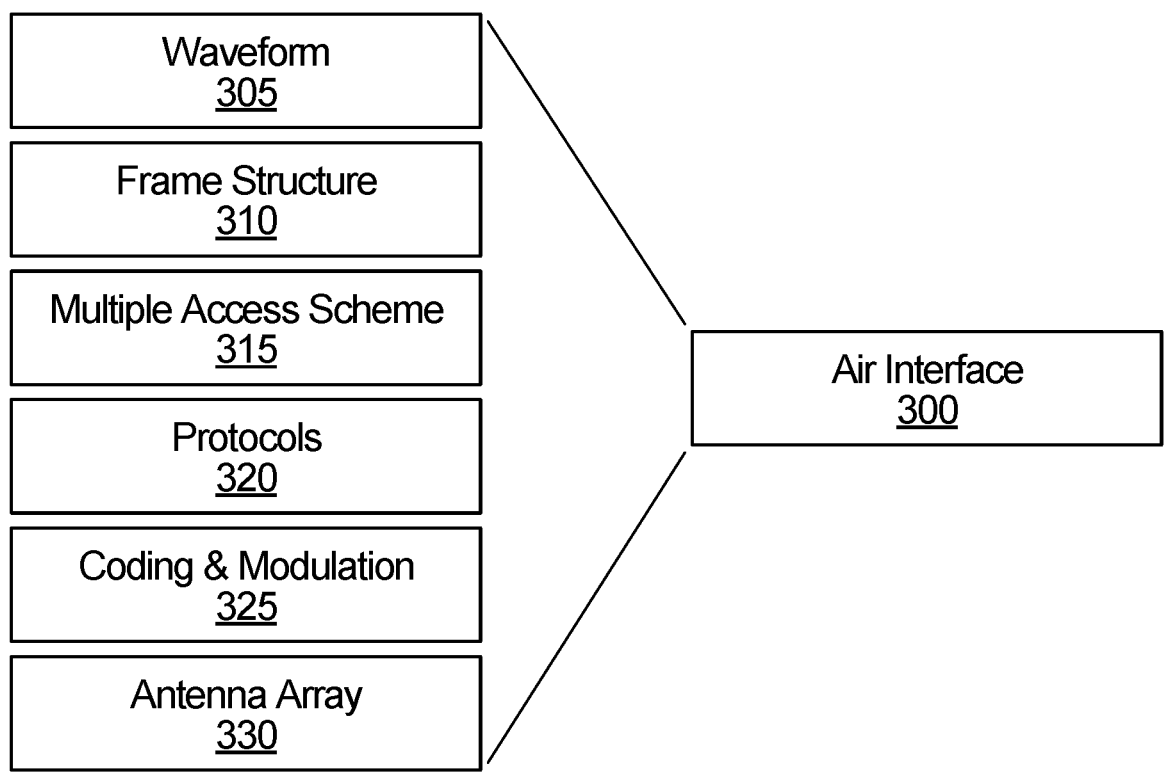
FIG. 5 illustrates an example air interface and components thereof.

As discussed above, a configurable air interface has been proposed to address this issue. FIG. 5 illustrates a diagram of an example of a configurable air interface 300. Air interface 300 comprises a number of building blocks that collectively specify how a transmission is to be made and/or received. The building blocks of air interface 300 may include waveform building block 305, frame structure building block 310, multiple access scheme building block 315, a protocols building block 320, a coding and modulation building block 325, and an antenna array processing building block 330.

Frame structure building block 310 may specify a configuration of a frame or group of frames. Non-limiting examples of frame structure options include a configurable multi-level transmission time interval (TTI), a fixed TTI, a configurable single-level TTI, a co-existence configuration, or configurable slot, mini slot, or configurable symbol duration block (SDB) and the like. The lengths of a TTI, slot, mini slot or SDB may also be specified. Frame structure building block 310 may also or instead specify timing parameters for DL and/or UL transmission, such as a transmission period for DL and/or UL, and/or a time switch gap between DL and UL transmissions. The frame structure can be for various duplexing schemes, such as time domain duplexing (TDD), frequency division duplexing (FDD) and full duplex operation.

Multiple access scheme building block 315 may specify how access to a channel is scheduled or configured for one or more users. Non-limiting examples of multiple access technique options include scheduled access, grant-free access, dedicated channel resource (no sharing between multiple users), contention based shared channel resource, non-contention based shared channel resource, cognitive radio based access, and the like.

Protocols building block 320 may specify how a transmission and/or a re-transmission are to be made. Non-limiting examples of transmission and/or re-transmission mechanism options include those that specify a scheduled data pipe size, a signaling mechanism for transmission and/or re-transmission, a re-transmission mechanism, and the like.

Coding and modulation building block 325 may specify how information being transmitted may be encoded (decoded) and modulated (demodulated) for transmission (reception) purposes. Non-limiting examples of coding and/or modulation technique options include low density parity check (LDPC) codes, polar codes, turbo trellis codes, turbo product codes, fountain codes, rateless codes, network codes, binary phase shift keying (BPSK), π/2-BPSK, quadrature phase shift keying (QPSK), quadrature amplitude modulation (QAM) such as 16QAM, 64QAM, 256QAM, hierarchical modulation, low PAPR modulation, non-linear modulation non-QAM based modulation, and the like.

Waveform building block 305 may specify a shape and form of a signal being transmitted. Non-limiting examples of waveform options include Orthogonal Frequency Division Multiplexing (OFDM) based waveform such as filtered OFDM (f-OFDM), Wavelet Packet Modulation (WPM), Faster Than Nyquist (FTN) Waveform, low Peak to Average Ratio Waveform (low PAPR WF such as DFT spread OFDM waveform), Filter Bank Multicarrier (FBMC) Waveform, Single Carrier Frequency Division Multiple Access (SC-FDMA), and the like. For OFDM-based waveforms, the waveform building block 305 may specify the associated waveform parameters such as sub-carrier spacings and cyclic prefix (CP) overhead.

Antenna array processing building block 330 may specify parameters for antenna array signal processing for channel acquisition and precoding/beamforming generation. In some embodiments, the functionality of the waveform building block 305 and the antenna array processing building block 330 may be combined as a multiple antenna waveform generator block.

Since the air interface 300 comprises a plurality of building blocks, and each building block may have a plurality of candidate technologies, it may be possible to configure a large number of different air interface profiles, where each air interface profile defines a respective air interface configuration option.

For example, the configurable air interface proposed for new radio (NR) networks allows service or slice based optimization, which can be advantageous because the potential application requirements for air interface technologies can be complex and diverse. Similar to the air interface 300 shown in FIG. 3, the configurable air interface proposed for 5G networks supports adaptive waveform, adaptive protocols, adaptive frame structure, adaptive coding and modulation family and adaptive multiple access schemes. With such mechanisms, the air interface can potentially accommodate a wide variety of user services, spectrum bands and traffic levels.

Figure 6:
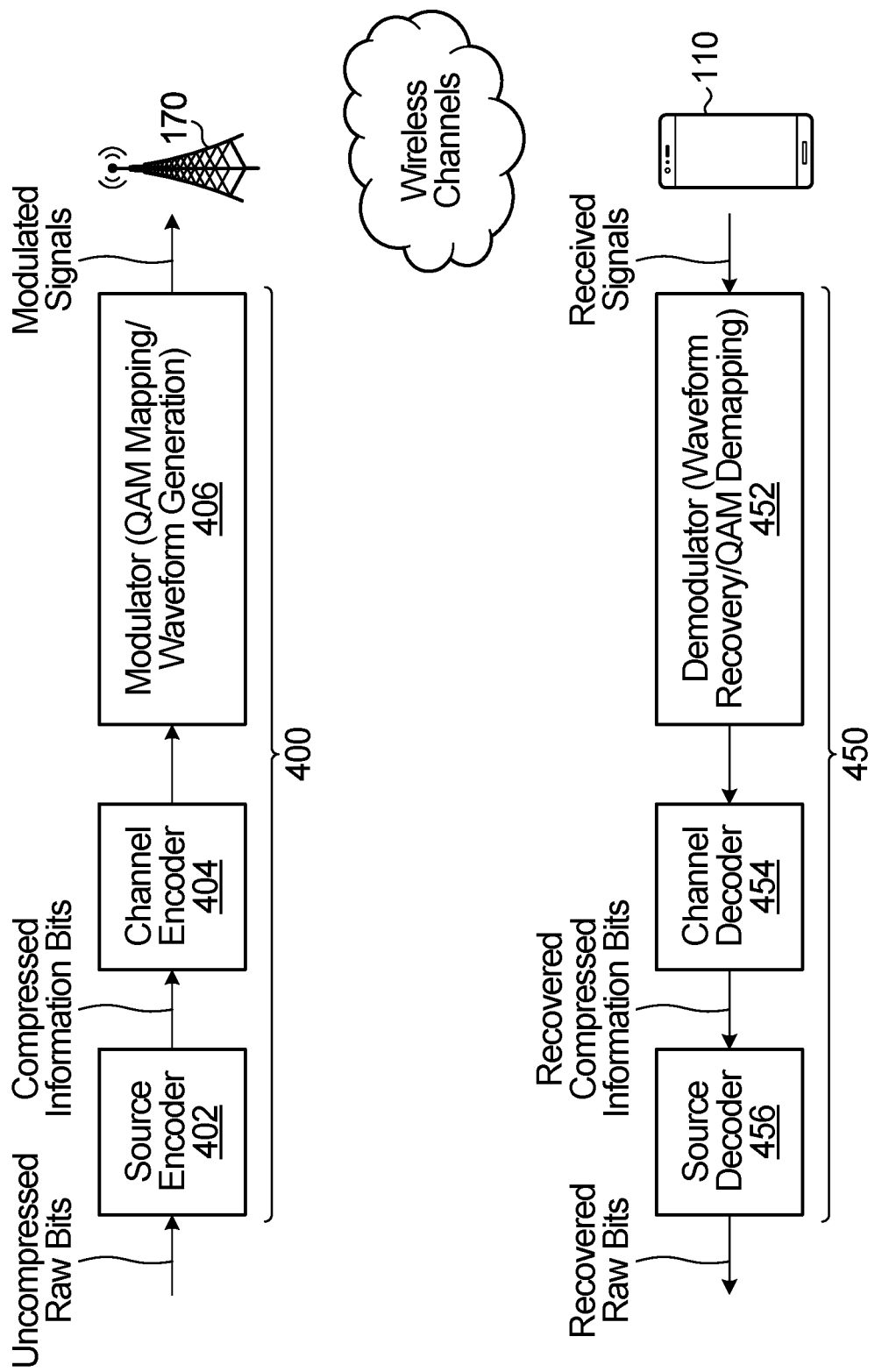
FIG. 6 is a block diagram of a transmit chain of a network device and a receive chain of a user equipment device that are configured to communicate over an air interface.

FIG. 6 illustrates an example of components in a transmit chain 400 of a base station 170 and components of a receive chain 450 of a UE 110 that may be configurable as part of a configurable air interface to allow the base station 170 and the UE 110 to communicate.

The components of the transmit chain 400 of the base station 170 include a source encoder 402, a channel encoder 404 and a modulator 406. Source encoder 402, channel encoder 404 and modulator 406 may each be implemented as a specific hardware block, or may be implemented in part as software modules executing in a processor, such as a microprocessor, a digital signal processor, a custom application specific integrated circuit, or a custom compiled logic array of a field programmable logic array.

The components of the receive chain 450 of the UE 110 include a demodulator 452 and a channel decoder 454. Demodulator 452 and channel decoder 454 may each be implemented as a specific hardware block, or may be implemented in part as software modules executing in a processor, such as a microprocessor, a digital signal processor, a custom application specific integrated circuit, or a custom compiled logic array of a field programmable logic array.

In operation, source encoder 402 encodes uncompressed raw data to generate compressed information bits, which are in turn encoded by channel encoder to generate channel coded information bits, which are then modulated by modulator 406 to generate modulated signals. In this example, the modulation performed by modulator 406 includes quadrature amplitude modulation (QAM) mapping and waveform generation. The modulated signals generated by modulator 406 are transmitted from base station 170 to UE 110 over one or more wireless channels. A base station can have multiple transmit antennas, in which case a waveform may be generated for each of the antennas. In such cases, the generated waveforms may contain different contents for each of the multiple transmit antennas, e.g., in a MIMO mode transmission. At UE 110, the received signals from base station 170 are demodulated by demodulator 452 to generate demodulated signals. A UE can have multiple receive antennas, in which case demodulator 452 may be configured to process waveforms received from multiple receive antennas as part of the waveform recovery process. The demodulated signals generated by demodulator 452 are decoded by channel decoder 454 to generate recovered compressed information bits. Source decoder 456 decodes the recovered compressed information bits to generate recovered uncompressed raw data.

Waveform here in the embodiment of FIG. 4 or the following embodiments, may specify a shape and form of a signal being transmitted. Non-limiting examples of waveform options include Orthogonal Frequency Division Multiplexing (OFDM) based waveform such as filtered OFDM (f-OFDM), Wavelet Packet Modulation (WPM), Faster Than Nyquist (FTN) Waveform, low Peak to Average Ratio Waveform (low PAPR WF such as DFT spread OFDM waveform), Filter Bank Multicarrier (FBMC) Waveform, Single Carrier Frequency Division Multiple Access (SC-FDMA), and the like. For OFDM-based waveforms, the waveform may specify the associated waveform parameters such as sub-carrier spacings and cyclic prefix (CP) overhead.

The coding and modulation performed by the components of the transmit chain 400 and the corresponding demodulation and decoding performed by the components of the receive chain 450 may be configured according to a modulation and coding scheme (MCS) corresponding to a service or slice specific air interface in order to support delivery of a service or application to UE 110 according to the selected code scheme and modulation scheme. If the service and/or network slice over which the service is provided changes, the configurations of the components of the transmit and receive chains of the base station 170 and UE 110 may be changed to match a new predetermined service or slice specific air interface corresponding to the new service or network slice. As noted above, a service or slice specific air interface such as this, which is based on selecting from a predetermined subset of parameters or technologies for a predetermined subset of air interface components, can potentially accommodate a wide variety of user services, spectrum bands and traffic levels.

However for each service, the transmission condition and requirements can still be quite different for each UE/device, which means, for example, that an air interface configuration that may be optimal for delivering a service to one UE/device may not necessarily be optimal for delivering the same service to another UE. Therefore, it would be desirable to provide further optimization of a UE/device specific air interface configuration.

Machine learning (ML) and artificial intelligence (AI) approaches have been used for solving many difficult and complex problems. To assist in understanding the present disclosure, some background discussion of ML and AI is now provided. AI is an emerging and fast-growing field thanks to the advances made in the field of computer architecture and in particular general purpose graphics processing units (GP-GPUs). A neural network, which is a form of ML, may be considered as a type of fitting function. Deep learning is one realization of a neural network, which contains more than one interconnected layer of artificial neurons. To train a deep neural network to fit a function (e.g., training using a great amount of input samples and output samples), the weight and threshold of each neuron are updated iteratively, so as to minimize an overall loss function or maximize an overall reward function. The iteration may be achieved by a gradient-descent or ascent back-propagation algorithm over training samples, which may require that the deep neural network architecture and the loss or reward function be mathematically differentiable.

Trainability typically requires: a function set (the neural network architecture) that defines an exploration space boundary within which a gradient-descent algorithm may traverse; and one or more loss (or reward) function(s) being differentiable with respect to each neuron's coefficient (for gradient-ascent or descent training) on that neural network architecture.

A deep neural network is often used for performing feature capture, and for performing prediction. Feature capture serves to extract useful information from a number of complex data, and this may be considered a form of dimension reduction. Prediction involves interpolation or extrapolation, to generate new data (generally referred to as predicted or estimated data) from sample data. Both these tasks may assume that the input data possess an intrinsic autoregression characteristic. For example, a pixel of an image usually has some relationship with its neighboring pixels. A convolutional neural network (CNN) may be developed to use this relationship to reduce the dimension of the data.

The present disclosure describes examples that may be used to implement new air interfaces for wireless communication that are tailored or personalized on a device-specific basis using AI/ML to provide device-specific air interface optimization. For example, embodiments of the present disclosure include new air interfaces that go beyond a network slice/service specific air interface to a personalized tailored air interface that includes a personalized service type and a personalized air interface setting. Examples of such personalized air interface settings may include one or more of the following: customized code scheme and modulation scheme; customized transmission scheme such as MIMO beamforming (BF), including channel acquisition/reconstruction and precoding; customized waveform type and associated parameters such as customized pulse shapes and parameters such as roll-off factors of an RRC pulse; customized frame structure; customized transmission/retransmission scheme and associated parameters such as product-code or inter-codebook or inter-TB 2D joint coding based retransmission and parameters such as incremental parity bit size and interleavers used; UE cooperation based retransmission and/or customized transmit-receive point (TRP) layer/type.

In some embodiments, the personalized tailored air interface parameters may be determined using AI/ML based on the physical speed/velocity at which the device is moving, a link budget of the device, the channel conditions of the device, one or more device capabilities and/or a service type that is to be supported. In some embodiments, the service type itself can be customized with UE-specific service parameters, such as quality of service (QoS) requirement(s), traffic pattern, etc.

In some embodiments, the personalized tailored air interface parameters may be optimized on the fly with minimal signaling overhead. For example, for 5G network implementations, the parameters may be configured from pre-defined candidate parameter sets. For next generation network implementations, e.g., for sixth generation (6G) networks, the parameters maybe adapted in a more flexible manner with real time or near real time optimization.

As will be discussed later, the level or type of air interface optimization available to a device may depend on the AI/ML capability of the device. If a user equipment has some AI/ML capability, the UE can work together with network device(s) to optimize its air interface (i.e., both sides of the air interface apply AI/ML to optimize the air interface). A UE that has no AI/ML capability may still help a network device to optimize an air interface during a training phase and/or during a normal operation phase by providing some types of measurement results to the network device for use in training AI/ML component(s) of the network device. For example, a high end AI/ML capable device may be able to benefit from full scale self-optimization of each component of an air interface (e.g., optimization of coding, modulation and waveform generation, MIMO operation optimization). A lower end AI/ML capable device may only be able to benefit from partial self-optimization of less than all components of an air interface. In some cases, a device may be dependent on centralized learning/training (e.g., all learning is done centrally in the network, such as at a base station). In other cases, learning/training may be based on federated learning, which is a machine learning technique that trains an algorithm across multiple decentralized edge devices or servers holding local data samples, without exchanging their data samples. In still other cases, learning/training may also or instead involve device cooperative learning.

As discussed above, an air interface generally includes a number of components and associated parameters that collectively specify how a transmission is to be made and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying data over a wireless communications link. The methods and devices disclosed herein provide a mechanism of AI/ML enabled/assisted air interface personalized optimization that supports different levels of per-UE/device based optimization. The disclosed examples also provide over the air signaling mechanisms to support per-UE/device based air interface function optimization.

Figure 7A:
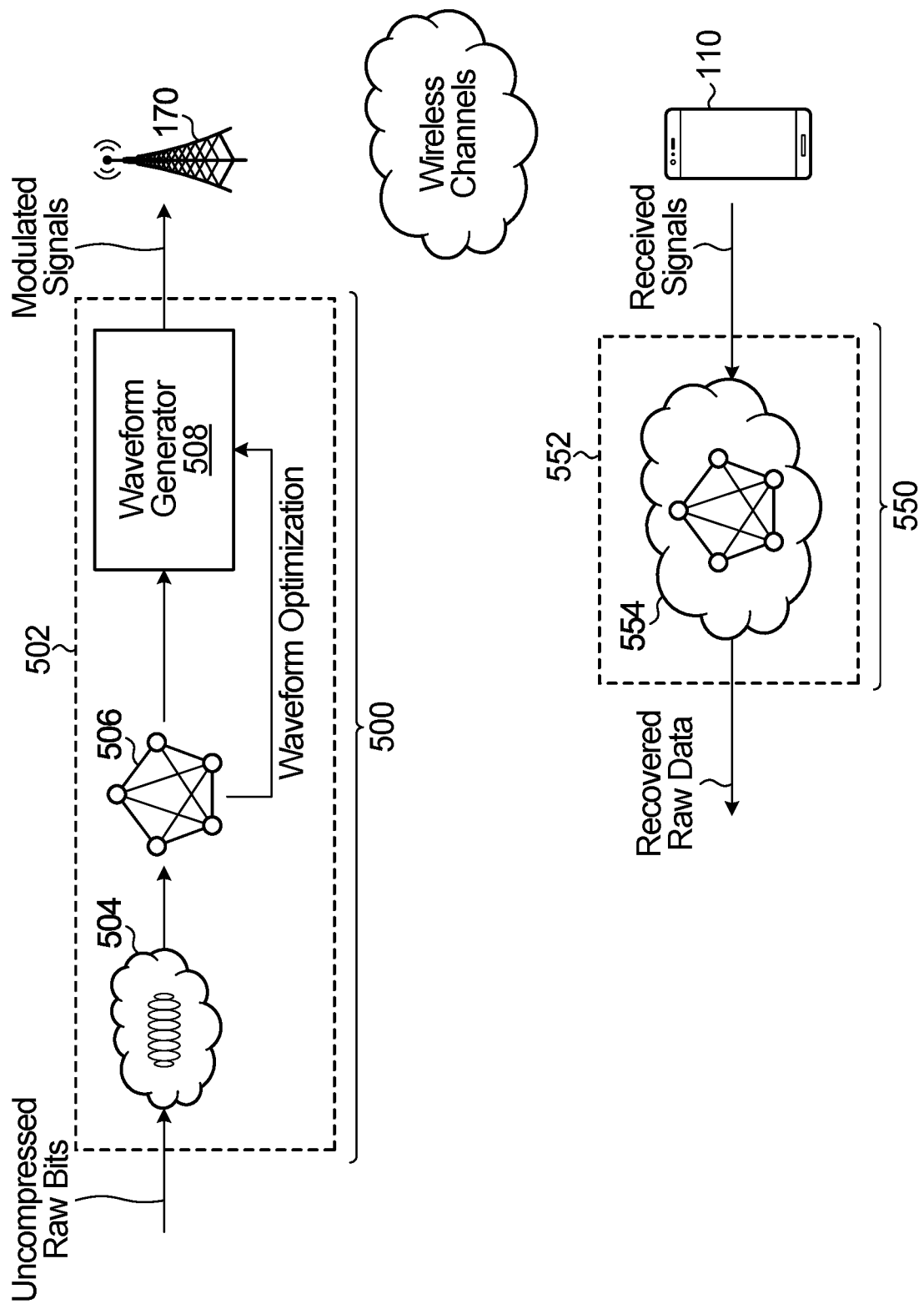
FIG. 7A is a block diagram of a first example of a transmit chain of a network device and a receive chain of a user equipment device that include machine learning components enabling device-specific tailoring/customization of an air interface, in accordance with a first embodiment of this disclosure.

FIG. 7A illustrates a first example of a transmit chain 500 of a base station 170 and a receive chain 550 of a UE 110 that each include an AI/ML module 502,552 that is trainable in order to provide a tailored personalized air interface between the base station 170 and UE 110, in accordance with an embodiment of the present disclosure. AI/ML components as referenced herein are intended to be modules or blocks based on an implementation of ML mechanisms. One example of an ML implementation is a neural network implemented in hardware, one or more components that execute software, or a combination thereof.

The AI/ML module 502 of the base station 170 includes a joint source and channel encoder component 504, a modulator component 506 and a waveform generator component 508.

The AI/ML module 552 of the UE 110 includes a joint waveform recovery, demodulator and source and channel decoder component 554.

The AI/ML module 502 provides AI/ML based autonomous optimization of all basic baseband signal processing functions including channel coding (or source coding plus channel coding) via encoding component 504, modulation via modulation component 506 and waveform generation via waveform generator 508. The base station 170 may have multiple transmit antennas, and in such embodiments the waveform generator 508 may be configured to generate a waveform for each of the transmit antennas. The AI/ML module 552 at the UE 110 provides the reciprocal based band processing functionality in order to recover information bits/raw data from signals received from the base station 170. The UE 110 may have multiple receive antennas, and in such embodiments the AI/ML module 552 may be configured to process waveforms received from multiple receive antennas as part of the waveform recovery process.

The coding, modulation and waveform generation may be optimized individually or two or more may be jointly optimized.

Several options are possible for individual optimization of the various components of the AI/ML modules 502, 552. Some non-limiting examples of these options are described below.

For example, for individual optimization of channel coding without a predefined coding scheme and parameters, self-learning/training and optimization may be used to determine an optimal coding scheme and parameters. For example, in some embodiments, a forward error correction (FEC) scheme is not predefined and AI/ML is used to determine a UE specific customized FEC scheme. In such embodiments, autoencoder based ML may be used as part of an iterative training process during a training phase in order to train an encoder component at a transmitting device and a decoder component at a receiving device. For example, during such a training process, an encoder at a base station and a decoder at a UE may be iteratively trained by exchanging a training sequence/updated training sequence. In general, the more trained cases/scenarios, the better performance. After training is done, the trained encoder component at the transmitting device and the trained decoder component at the receiving device can work together based on changing channel conditions to provide encoded data that may outperform results generated from a non-AI/ML based FEC scheme. In some embodiments, the AI/ML algorithms for self-learning/training and optimization may be downloaded by the UE from a network/server/other device.

For individual optimization of channel coding with predefined coding schemes, such as low density parity check (LDPC) code, Reed-Muller (RM) code, polar code or other coding scheme, the parameters for the coding scheme can be optimized.

The parameters for channel coding can be signaled to UE from time to time (periodically or event triggered), e.g., via radio resource control (RRC) signaling or dynamically through downlink control information (DCI) in a dynamic downlink control channel or the combination of the RRC signaling and DCI, or group DCI, or other new physical layer signaling. Training can be done all on the network side or assisted by UE side training or mutual training between the network side and the UE side.

Figure 7B:
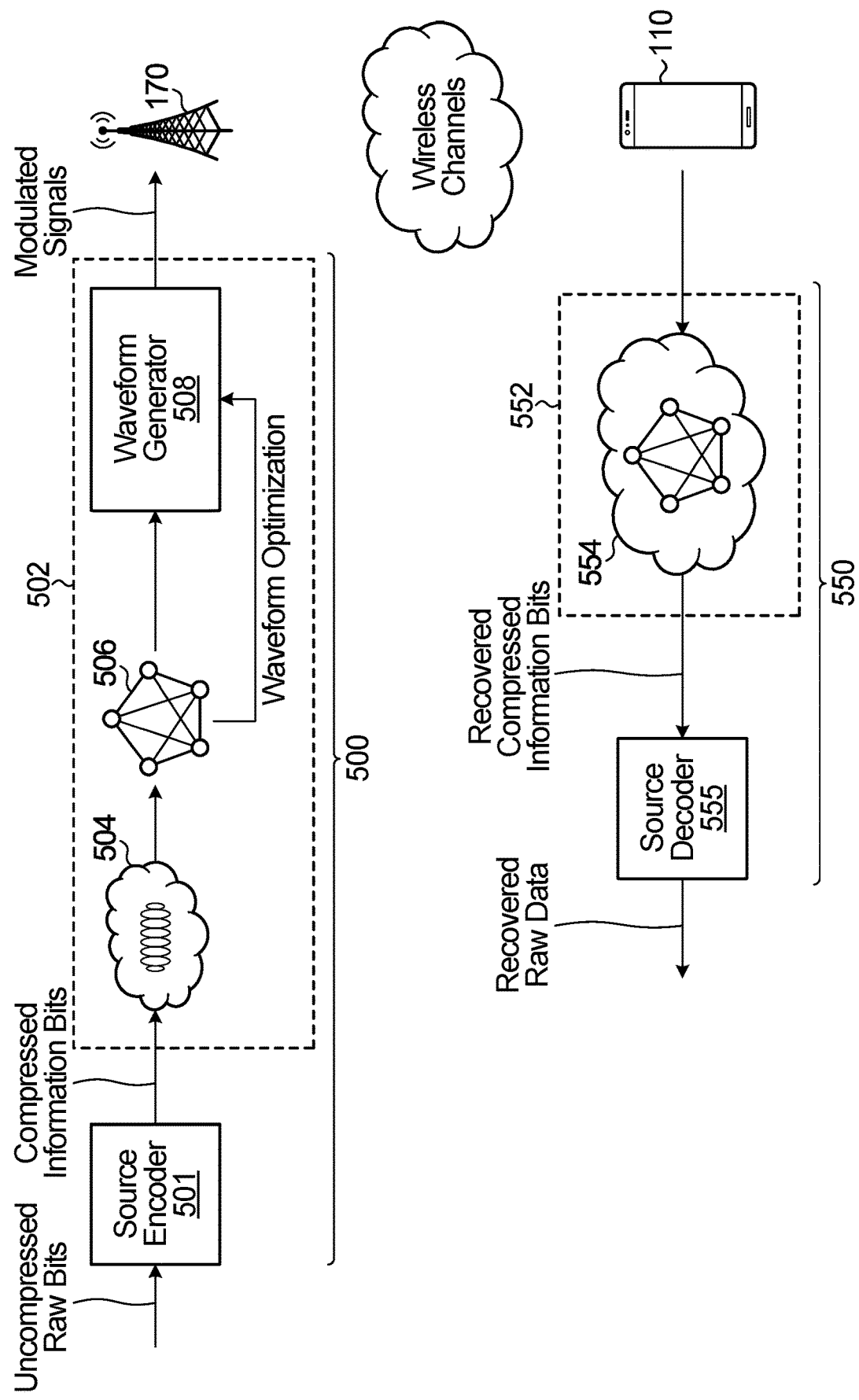
FIG. 7B is a block diagram of a second example of a transmit chain of a network device and a receive chain of a user equipment device that include machine learning components enabling device-specific tailoring/customization of an air interface, in accordance with the first embodiment of this disclosure.

In the example illustrated in FIG. 7A, the input to AI/ML module 502 is uncompressed raw data and source coding and channel coding are done jointly by AI/ML component 504. An alternative example is illustrated in FIG. 7B, in which source coding is done separately by a source encoder 501 to generate compressed information bits that are then received by AI/ML module 502 where they are channel coded by AI/ML component 504. Similarly, in the example illustrated in FIG. 7B, the output of the AI/ML module 552 at the UE 110 is recovered compressed information bits that are then decoded by a source decoder 555 to generate recovered raw data, whereas the AI/ML module 552 in FIG. 7A outputs recovered raw data.

For individual optimization of modulation without a predefined constellation, modulation may be done by an AI/ML module, the optimization targets and or algorithms of which (e.g., the AI/ML component 506) are understood by both the transmitter and the receiver (e.g., the base station 170 and UE 110, respectively, in the example scenario shown in FIG. 7A). For example, the AI/ML algorithm may be configured to maximize Euclidian or non-Euclidian distance between constellation points.

For individual optimization of modulation with a predefined non-linear modulator, the parameters for the modulation may be done by self-optimization.

For individual optimization of waveform generation without a predefined waveform type, without a predefined pulse shape and without predefined waveform parameters, self-learning/training and optimization may be used to determine optimal waveform type, pulse shape and waveform parameters. In some embodiments, the AI/ML algorithms for self-learning/training and optimization may be downloaded by the UE from a network/server/other device.

In some embodiments, there may be a finite set of predefined waveform types, and selection of a predefined waveform type from the finite set and determination of the pulse shape and other waveform parameters may be done through self-optimization.

Several options are also possible for joint optimization of two or more of the components of the AI/ML modules 502, 552. Some non-limiting examples of these options are described below.

For example, in some embodiments, the coding via component 504 (channel coding or joint source and channel coding) and the modulation implemented via component 506 may be jointly optimized with AI/ML, and the waveform generation via component 508 may be optimized separately. Multi-dimensional modulation, which is conceptually similar to trellis-coded modulation, is one example of a combined coding and modulation scheme that may be used in some embodiments of the present disclosure. For example, in some embodiments, AI/ML may be used to create a customized multi-dimensional modulation scheme for a pair of communicating devices, e.g., a base station and a UE.

In other embodiments, the modulation via component 504 and the waveform generation via component 508 may be jointly optimized with AI/ML, and the coding via component 504 may be optimized separately. In other embodiments, the coding, modulation and waveform generation may all be jointly optimized with AI/ML.

Figure 8A:
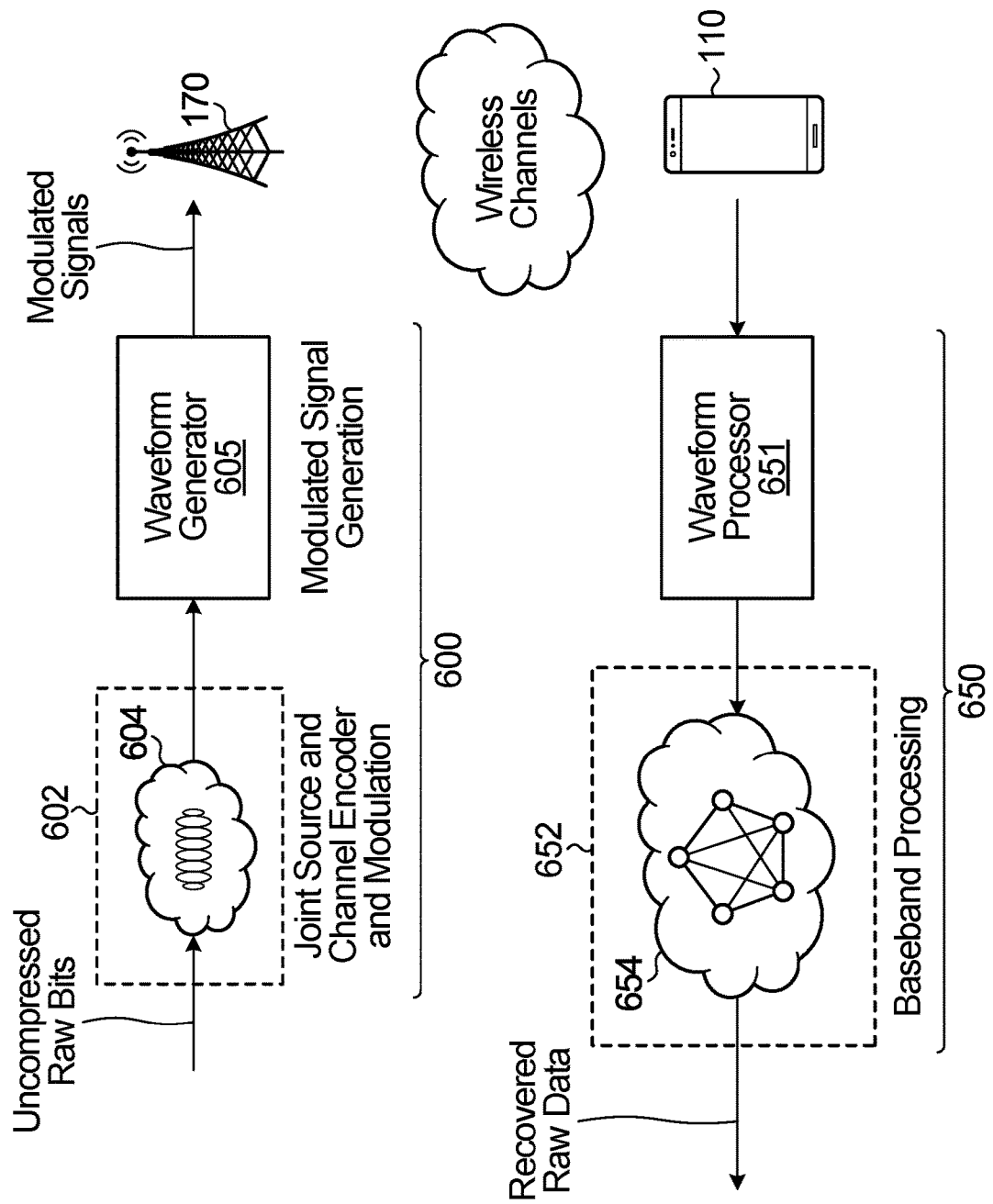
FIG. 8A is a block diagram of a first example of a transmit chain of a network device and a receive chain of a user equipment device that include machine learning components enabling device-specific tailoring/customization of an air interface, in accordance with a second embodiment of this disclosure.
Figure 8B:
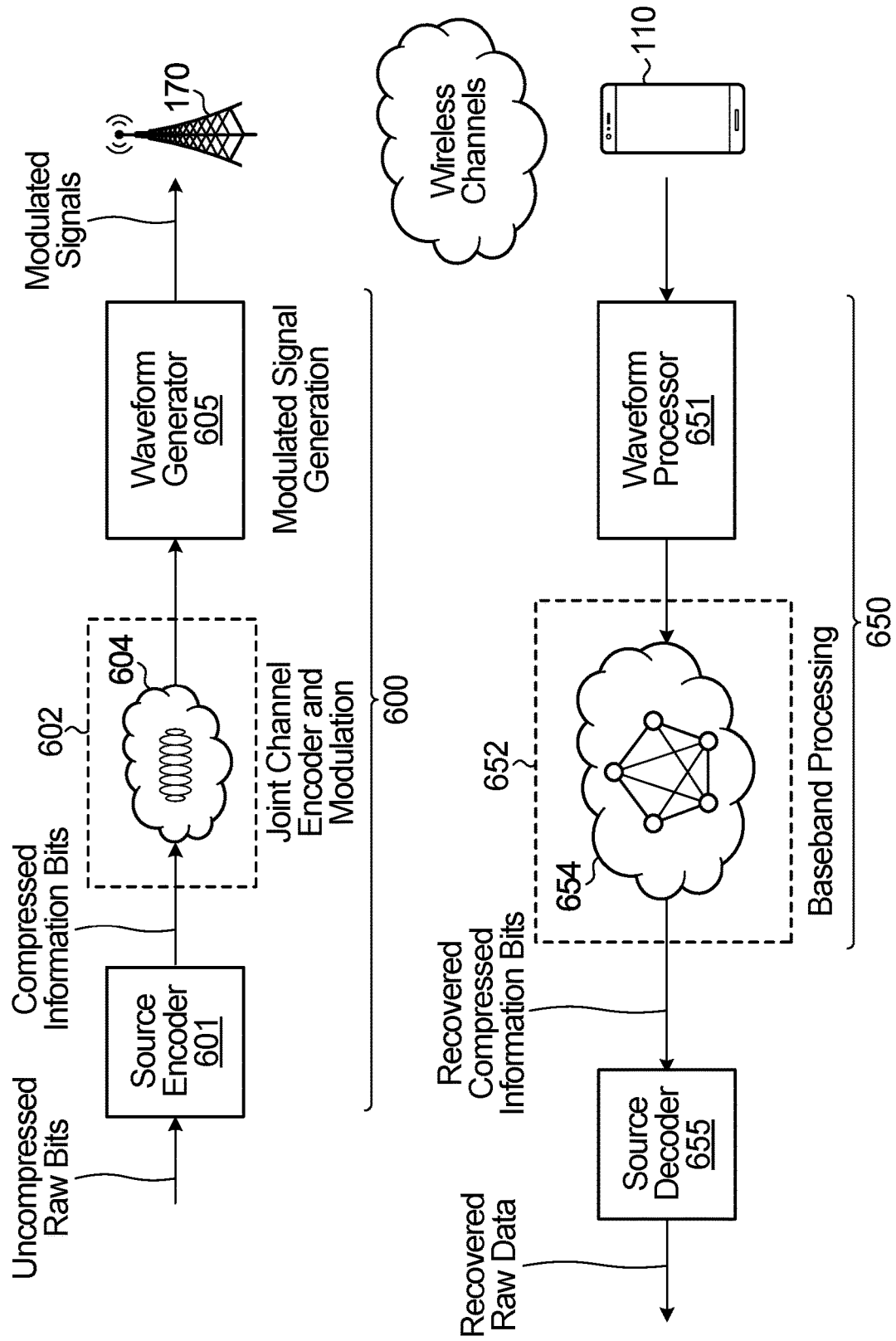
FIG. 8B is a block diagram of a second example of a transmit chain of a network device and a receive chain of a user equipment device that include machine learning components enabling device-specific tailoring/customization of an air interface, in accordance with the second embodiment of this disclosure.

FIGS. 8A and 8B illustrate examples of a transmit chain 600 of a base station 170 and a receive chain 650 of a UE 110 that each include an AI/ML module 602,652 that is trainable in order to realize UE specific optimization and/or provide a tailored or personalized air interface between the base station 170 and UE 110, in accordance with a second embodiment of the present disclosure. In the example shown in FIG. 8A, the transmit chain 600 of base station 170 includes an AI/ML module 602 and a waveform generator 605. AI/ML module 602 of the base station 170 includes a joint source and channel encoder and modulation component 604. Similarly, in this example the receive chain 650 of UE 110 includes a waveform processor 651 and an AI/ML module 652, which includes a joint demodulator and source and channel decoder component 654.

Unlike the examples shown in FIGS. 7A and 7B, in which the AI/ML modules 502,552 provide AI/ML based autonomous optimization of all basic baseband signal processing functions including coding/decoding, modulation/demodulation and waveform generation/processing, in the example shown in FIG. 8A the AI/ML module 602 provides AI/ML based autonomous optimization of coding and modulation via component 604, and non-AI/ML based waveform generation is managed independently via waveform generator 605. The base station 170 may have multiple transmit antennas, and in such embodiments the waveform generator 605 may be configured to generate a waveform for each of the transmit antennas. The AI/ML module 652 at the UE 110 provides the reciprocal optimized baseband processing functionality on modulated signals recovered by waveform processor 651. The UE 110 may have multiple receive antennas, and in such embodiments the waveform processor 651 may be configured to process waveforms received from multiple receive antennas as part of the waveform recovery process.

In the example illustrated in FIG. 8A, the input to AI/ML module 602 is uncompressed raw data and joint source and channel coding and modulation are done by AI/ML component 604. The example illustrated in FIG. 8B differs from the example illustrated in FIG. 8A in that in FIG. 8A source coding is done separately by a source encoder 601 to generate information bits that are then received by AI/ML module 602 where they are jointly channel coded and modulated by AI/ML component 604. Similarly, in the example illustrated in FIG. 8B, the output of the AI/ML module 652 at the UE 110 is recovered compressed information bits that are then decoded by a source decoder 655 to generate recovered raw data, whereas the AI/ML module 652 in FIG. 8A outputs recovered raw data.

In the examples shown in FIGS. 8A and 8B, training of the AI/ML modules 602 and 652 may be done by self-learning/training optimization. Coding and modulation may be optimized by AI/ML separately or jointly, as discussed earlier.

As mentioned above, in the examples shown in FIGS. 8A and 8B, waveform generation via waveform generator 605 at base station 170 and waveform processing via waveform processor 651 at UE 110, may be managed without AI/ML. For example, waveform types and waveform parameters may be predefined and a waveform may be selected from a predefined set of candidate waveforms according to transmission requirements, such as peak to average power ratio (PAPR), frequency band, frequency localization, and the like. Alternatively, the waveform type and waveform parameters may be dynamically signaled to a UE via for example downlink control information (DCI) or radio resource control (RRC) signaling. In some embodiments, the predefined set of candidate waveforms may include single-carrier waveform and multi-carrier waveforms. Furthermore, the predefined set of candidate waveforms may include multiple candidate waveforms that differ in terms of one or more parameters. For example, there may be multiple candidate single-carrier waveforms predefined, such as single carrier offset QAM (OQAM) waveforms, with root-raised cosine pulse, and predefined roll-off factors.

Figure 9:
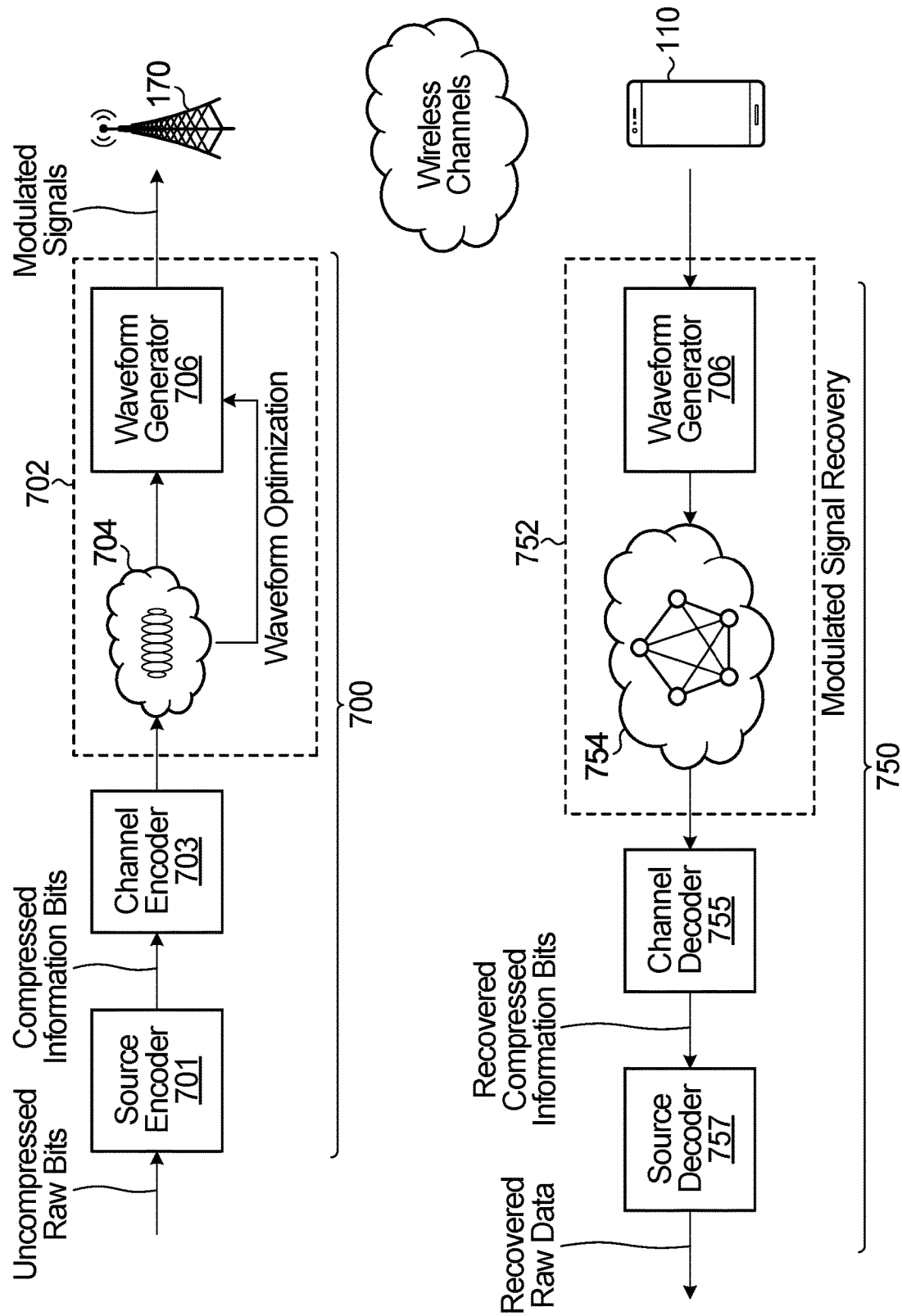
FIG. 9 is a block diagram of an example of a transmit chain of a network device and a receive chain of a user equipment device that include machine learning components enabling device-specific tailoring/customization of an air interface, in accordance with a third embodiment of this disclosure.

FIG. 9 illustrates an example of a transmit chain 700 of a base station 170 and a receive chain 750 of a UE 110 that each include an AI/ML module 702,752 that is trainable in order to provide a tailored personalized air interface between the base station 170 and UE 110, in accordance with a third embodiment of the present disclosure.

In the example shown in FIG. 9, the transmit chain 700 of base station 170 includes a source encoder 701, a channel encoder 703 and an AI/ML module 702 that includes a modulation component 704 and a waveform generator component 706. In this example the receive chain 750 of UE 110 includes an AI/ML module 752, which includes a waveform processor component 756 and a demodulator component 754, a channel decoder 755 and a source decoder 757.

Unlike the previous examples shown in FIGS. 7A, 7B, 8A and 8B, the example shown in FIG. 9 utilizes non-AI/ML based source and channel coding/decoding and AI/ML based modulation/demodulation and waveform generation/processing. At UE 110, the waveform processor component 756 and the demodulator component 754 of the AI/ML module 652 provide the reciprocal optimized modulated signal recovery and demodulation functionality to recover modulated information bits. The recovered modulated information bits are decoded by channel decoder 755 to generate recovered compressed information bits, which are in turn decoded by source decoder 757 to generate recovered raw data.

In the example shown in FIG. 9, training of the AI/ML modules 602 and 652 may be done by self-learning/training optimization. Modulation and waveform generation may be optimized by AI/ML separately or jointly, as discussed earlier. As mentioned above, in the example shown in FIG. 9, source and channel coding via source encoder 701 and channel encoder 703 at base station 170 and channel and source decoding via channel decoder 755 and source decoder 757 at UE 110, may be managed without AI/ML. For example, coding schemes and associated parameters may be predefined and a coding scheme may be selected from a predefined set of coding schemes according to a transmission requirement. Alternatively, the coding scheme and associated parameters may be dynamically signaled to a UE via for example downlink control information (DCI) or radio resource control (RRC) signaling.

Figure 10:
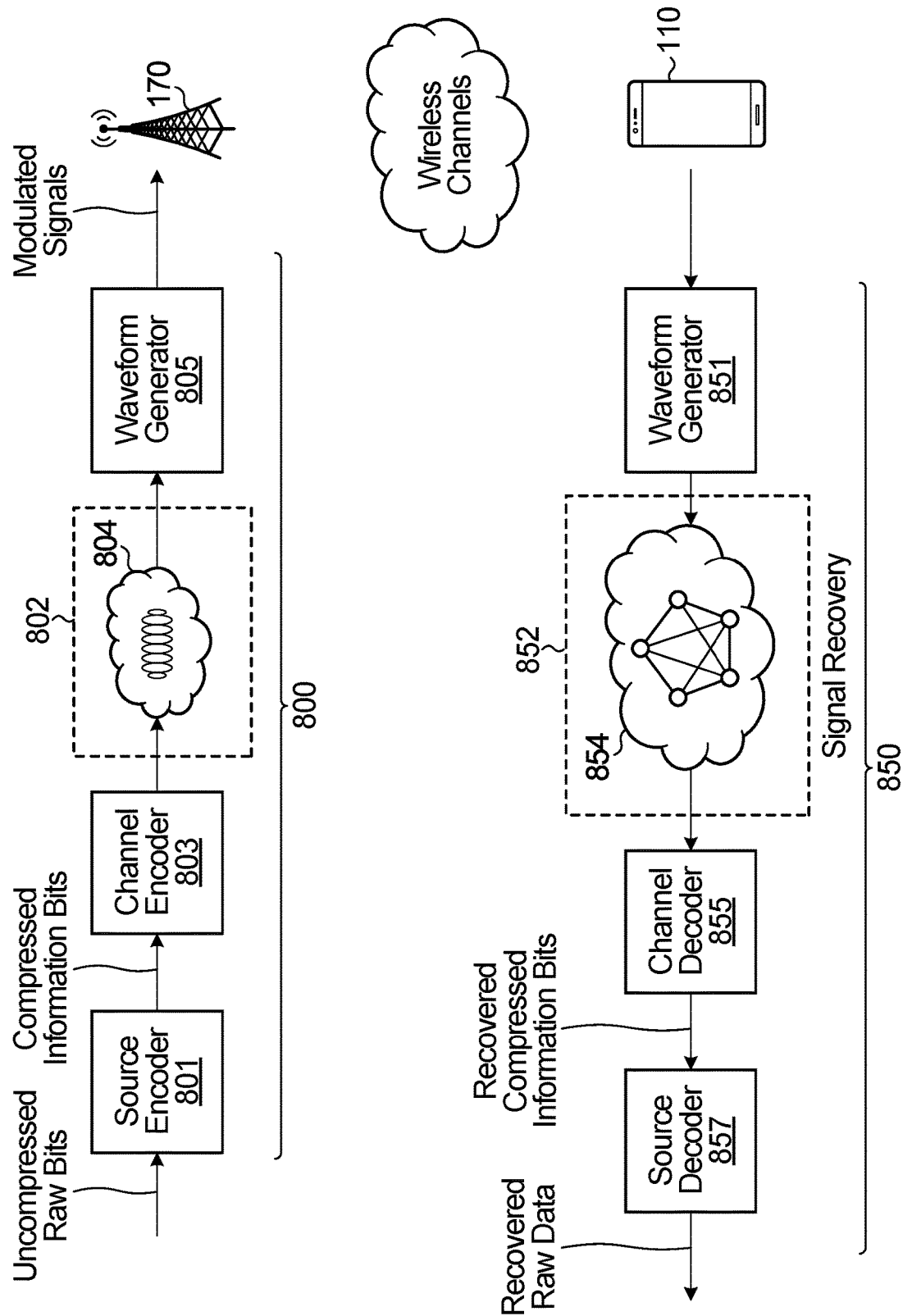
FIG. 10 is a block diagram of an example of a transmit chain of a network device and a receive chain of a user equipment device that include machine learning components enabling device-specific tailoring/customization of an air interface, in accordance with a fourth embodiment of this disclosure.

FIG. 10 illustrates an example of a transmit chain 800 of a base station 170 and a receive chain 850 of a UE 110 that each include an AI/ML module 802,852 that is trainable in order to provide a tailored personalized air interface between the base station 170 and UE 110, in accordance with a fourth embodiment of the present disclosure.

In the example shown in FIG. 10, the transmit chain 800 of base station 170 includes a source encoder 801, a channel encoder 803, an AI/ML module 802, which includes a modulation component 804, and a waveform generator 805. In this example the receive chain 850 of UE 110 includes a waveform processor 851, an AI/ML module 852, a channel decoder 855 and a source decoder 857. The AI/ML module 852 includes a demodulator component 854.

Unlike the previous examples, the example shown in FIG. 10 utilizes non-AI/ML based channel coding/decoding and waveform generation/processing and AI/ML based modulation/demodulation. At UE 110, the waveform processor 851, channel decoder 855 and source decoder 857 provide non AI/ML based signal recover, channel decoding and source decoding, respectively, and the demodulator component 854 of the AI/ML module 852 provides optimized demodulation functionality that is the reciprocal of the modulation functionality performed by the modulation component 804 at base station 170.

For optimization of modulation without a predefined constellation, an AI/ML algorithm implemented by modulation component 804 may be configured to maximize Euclidian or non-Euclidian distance between constellation points.

For optimization of modulation with a predefined non-linear modulator, the parameters for the modulation may be done by self-optimization, e.g., to optimize the distance of modulated symbols. In some scenarios, non-AI/ML based optimization of modulation may also or instead be utilized. As mentioned above, in the example shown in FIG. 10, source and channel coding via source encoder 801 and channel encoder 803 and waveform generation via waveform generator 805 at base station 170 and waveform processing via waveform processor 851 and channel and source decoding via channel decoder 855 and source decoder 857 at UE 110, may be managed without AI/ML. For example, waveform types and associated parameters as well as coding schemes and associated parameters may be predefined and a waveform type and a coding scheme may be selected from predefined sets according to a transmission requirement, as discussed previously. Alternatively, the coding scheme and associated parameters and/or the waveform type and waveform parameters may be dynamically signaled to a UE via for example downlink control information (DCI) or radio resource control (RRC) signaling.

Figure 11:
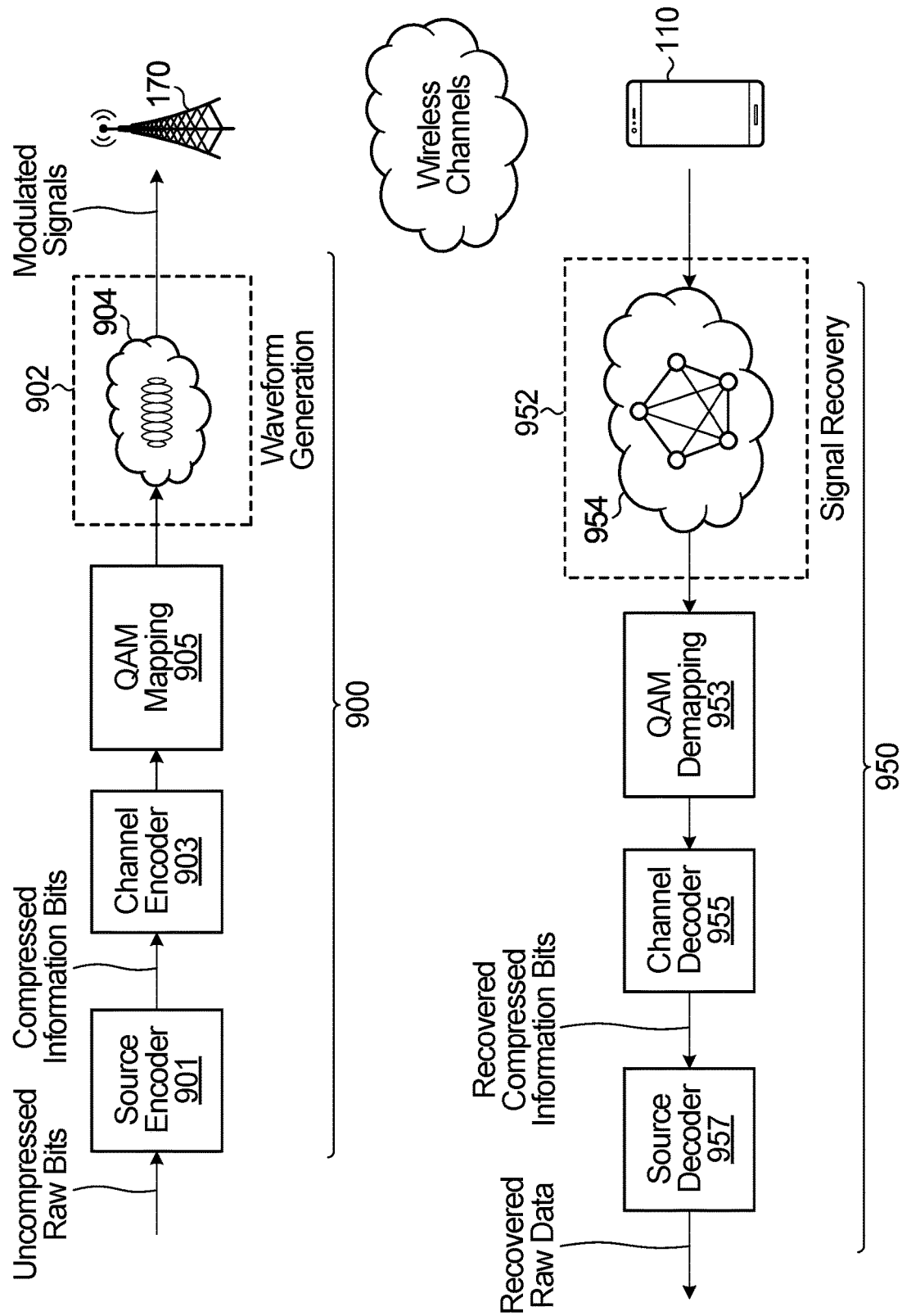
FIG. 11 is a block diagram of an example of a transmit chain of a network device and a receive chain of a user equipment device that include machine learning components enabling device-specific tailoring/customization of an air interface, in accordance with a fifth embodiment of this disclosure.

FIG. 11 illustrates an example of a transmit chain 900 of a base station 170 and a receive chain 950 of a UE 110 that each include an AI/ML module 902,952 that is trainable in order to provide a tailored personalized air interface between the base station 170 and UE 110, in accordance with a fifth embodiment of the present disclosure.

In the example shown in FIG. 11, the transmit chain 900 of base station 170 includes a source encoder 901, a channel encoder 903, a QAM mapping component 905 and an AI/ML module 902 that includes a waveform generation component 904. In this example the receive chain 950 of UE 110 includes an AI/ML module 952, a QAM demapping component 953, a channel decoder 955 and a source decoder 957. The AI/ML module 952 includes a waveform processing component 954.

Unlike the previous examples, the example shown in FIG. 11 utilizes non-AI/ML based source and channel coding/decoding and modulation/demodulation and AI/ML based or assisted waveform generation. The AI/ML based or assisted waveform generation may enable per UE based optimization of one or more waveform parameters, such as pulse shape, pulse width, subcarrier spacing (SCS), cyclic prefix, pulse separation, sampling rate, PAPR and the like.

For optimization of waveform generation without a predefined waveform type, without a predefined pulse shape and without predefined waveform parameters, self-learning/training and optimization may be used to determine optimal waveform type, pulse shape and waveform parameters. In some embodiments, the AI/ML algorithms for self-learning/training and optimization may be downloaded by the UE from a network/server/other device. In some embodiments, there may be a finite set of predefined waveform types, and selection of a predefined waveform type from the finite set and determination of the pulse shape and other waveform parameters may be done through self-optimization. In some scenarios, non-AI/ML based optimization of waveform generation may also or instead be utilized.

As mentioned above, in the example shown in FIG. 11, source and channel coding via source encoder 901 and channel encoder 903 and modulation via QAM mapping component 905 at base station 170 and demodulation via QAM demapping component 953 and channel and source decoding via channel decoder 955 and source decoder 957 at UE 110, may be managed without AI/ML. For example, a modulation and coding scheme and associated parameters may be selected from a predefined set of modulation and coding schemes according to a transmission requirement, as discussed previously. Alternatively, the modulation and coding scheme and associated parameters may be dynamically signaled to a UE via for example downlink control information (DCI) or radio resource control (RRC) signaling.

Examples of over the air information exchange procedures that may facilitate training of ML components of communicating devices, such as various ML components of the base stations 170 and UEs 110 of the examples shown in FIGS. 7 to 11 will now be described with reference to FIGS. 12 to 14.

Figure 12:
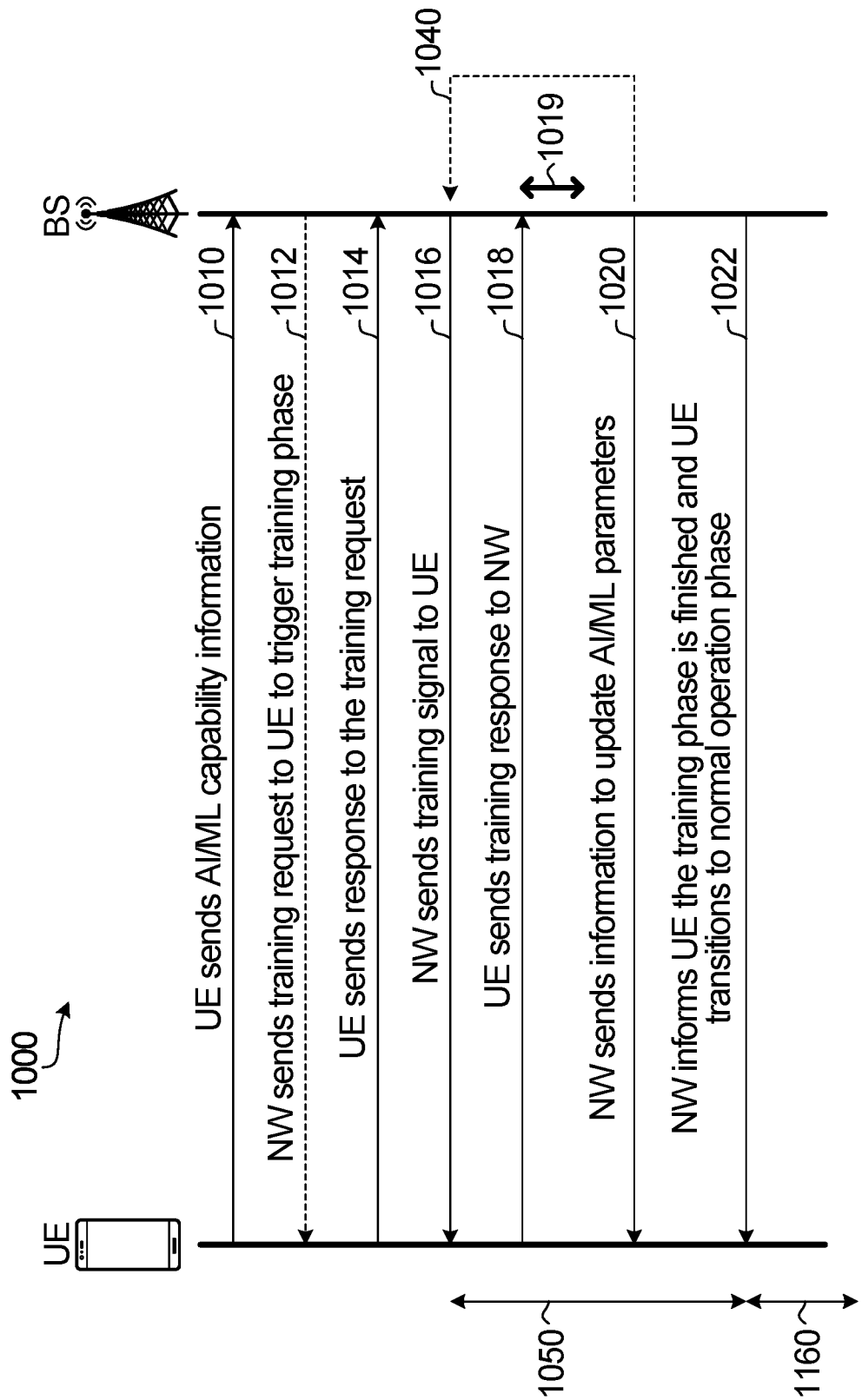
FIG. 12 illustrates an example of an over the air information exchange procedure for a training phase of machine learning components enabling device-specific tailoring/customization of an air interface, in accordance with an embodiment of this disclosure.

FIG. 12 is a signal flow diagram 1000 of an example of an over the air information exchange procedure for a training phase of machine learning components enabling device-specific tailoring/customization of an air interface, in accordance with an embodiment of this disclosure.

In the signal flow diagram 1000, a UE and a BS or other network device are involved in an information exchange for an AI/ML training phase 1150. Although only one UE and one BS are shown in FIG. 12 to avoid congestion in the drawing, data collection or information sharing during training, and similarly operation of a communication network, are expected to involve more than one UE and more than one BS. For example, in some embodiments training may be done with the joint efforts from multiple network devices and multiple UEs and air interface optimization may be done on a per UE basis.

The information exchange procedure begins with UE sending information indicating an AI/ML capability of the UE to the BS at 1010. The information indicating an AI/ML capability of the UE may indicate whether or not the UE supports AI/ML for optimization of an air interface. If the UE is capable of supporting AI/ML optimization, the information may also or instead indicate what type and/or level of complexity of AI/ML the UE is capable of supporting, e.g., which function/operation AI/ML can be supported, what kind of AI/ML algorithm can be supported (for example, autoencoder, reinforcement learning, neural network (NN), deep neural network (DNN), how many layers of NN can be supported, etc.). In some embodiments, the information indicating an AI/ML capability of the UE may also or instead include information indicating whether the UE can assist with training.

In some embodiments, the information sent at 1010 may include information indicating an AI/ML capability type of the UE. The AI/ML capability type may identify whether the UE supports AI/ML optimization of one or more components of the air interface of the device. For example, the AI/ML capability type may be one of a plurality of AI/ML capability types, where each AI/ML capability type corresponds to support for a different level of AI/ML capability. For example, the plurality of AI/ML capability types may include an AI/ML capability type that indicates the UE supports deep learning. As another example, the plurality of AI/ML capability types may include different types that indicate different combinations of air interface components that are optimizable by AI/ML. For example, the plurality of AI/ML capability types may include one or more of the following types:

- a type corresponding to support for AI/ML based optimization of all baseband signal processing components, such as coding (channel coding or joint source and channel coding), modulation and waveform generation (e.g., similar to the examples shown in FIGS. 7A and 7B);
- a type corresponding to support for AI/ML based optimization of coding and modulation, but not waveform generation (e.g., similar to the examples shown in FIGS. 8A and 8B);
- a type corresponding to support for AI/ML based optimization of modulation and waveform generation, but not coding (e.g., similar to the example shown in FIG. 9);
- a type corresponding to support for AI/ML based optimization of modulation, but not coding and waveform generation (e.g., similar to the example shown in FIG. 10);
- a type corresponding to support for AI/ML based optimization of waveform generation, but not coding and modulation (e.g., similar to the example shown in FIG. 11).

In some embodiments, the information sent by the UE to the BS at 1010 may be sent by the UE to the BS as part of an initial access procedure to access the network. In other embodiments, the information may also or instead be sent by the UE in response to a capability enquiry from the BS (not shown).

After receiving AI/ML capability information from the UE indicating that the UE supports AI/ML and can assist with training, the BS sends a training request to the UE at 1012 to trigger a training phase 1050. In some embodiments, the training request may be sent to the UE through DCI (dynamic signaling) on a downlink control channel or on a data channel. For example, in some embodiments the training request may be sent to the UE as UE specific or UE common DCI. For example, UE common DCI may be used to send a training request to all UEs or a group of UEs.

The UE may send a response to the training request to the BS, as indicated at 1014. This response may confirm that the UE has entered a training mode. However, such a response can be optional and may not be sent by a UE in some embodiments. At 1016 the BS starts the training phase 1050 by sending a training signal that includes a training sequence or training data to the UE. In some embodiments, the BS may send a training sequence/training data to the UE after a certain predefined time gap following transmission of the training request at 1012. In other embodiments, the BS may immediately transmit a training sequence/training data to the UE after transmitting the training request at 1012. In still other embodiments, the BS may wait until it has received a response to the training request from the UE before transmitting the training sequence/training data to the UE.

Non-limiting examples of channels that may be used by the BS to send training sequences/training data to UE include:

- Dynamic control channel: When the number of bits required to send the training sequence/training data is less than a certain threshold, a dynamic control channel may be used to send the training sequence/training data. In some embodiment, several levels of bit lengths may be defined. The different bit lengths may correspond to different DCI formats or different DCI payloads. The same DCI can be used for carrying training sequences/data for different AI/ML modules. In some embodiments, a DCI field may contain information indicating an AI/ML module the training sequence/training data is to be used to train.
- Data channel: In some embodiments, a data channel may be used to carry a training sequence/training data. In such embodiments, the payload of the data channel depends on the training sequence length or the amount of training data that is to be sent. The DCI used to schedule such a data channel can carry the information required for decoding the data channel and AI/ML module indicator(s) to indicate which AI/ML module(s) the training sequence/data is for.
- RRC channel: In some embodiments, training sequences/training data can be sent to UE via RRC signaling.

For its part, the UE starts to search for a training signal (e.g., a training sequence or training data) sent by the network after sending back a response to the training request at 1014 or after receiving the training request at 1012 with or without a predefined time gap. The channel resource and the transmission parameters for the training signal, such as MCS and demodulation reference signal (DMRS), can be predefined or preconfigured (for example by RRC signaling) or signaled by dynamic control signaling (similar to the detection of DCI for a scheduled data channel). In some embodiments, the training sequence/training data may be carried in a dynamic control channel directly (e.g., certain bits in a dynamic control channel may be reserved for carrying training sequence/training data).

At 1018 the UE sends a training response message to the BS that includes feedback information based on processing of the received training signal. In some embodiments, the training response message may include feedback information indicating an updated training sequence for an iterative training process (e.g., for autoencoder based ML) or certain type(s) of measurement results to help Tx/Rx to further train or refine the training of a NN, e.g., for enforcement learning. In some embodiments, such measurements may include, for example, the error margin obtained by the UE in receiving the training sequence/data from the BS. For example the measurement results may include information indicating the mean square of errors and/or an error direction (e.g., error increase or decrease). In some embodiments, the training response message may also or instead include other feedback information, such as an adjustment step size and direction (e.g., increase or decrease by X amount, where X is the adjustment step size). In some cases, the measurement results or feedback may be provided implicitly. For example the adjustment of beamforming can be indicated by the beam direction of the feedback signal. In some embodiments, the training response message may be sent by the UE through an uplink (UL) control channel. In other embodiments, the training response message may be partially or entirely sent through an UL data channel.

An AI/ML module that includes one or more AI/ML components, such as a neural network, is trained in the network based on the received training response message from the UE. In FIG. 12, this training is indicated at 1019. For example, the parameters of an AI/ML module, such as neural network weights, may be updated/modified based on measurement results returned by the UE. In some embodiments this training may be performed at least in part in the BS, while in other embodiments the training may be performed in part or in whole by another network device, such as a centralized AI/ML server (not shown). At 1020, the BS sends information to the UE to update AI/ML parameters, such as neural network weights, in order to optimize one or more aspects of the air interface between the UE and BS. In some embodiments this training process is done iteratively, as indicated at 1040, whereby the BS repeatedly transmits training sequence/data and iteratively refines AI/ML parameters based on training response messages from the UE. In some embodiments this iterative process may continue until one or more target criteria is satisfied or until a predefined number of iterations have occurred. It should be noted that not all embodiments involve AI/ML functionality at UEs and therefore AI/ML parameters need not necessarily be signaled to a UE in all embodiments. At 1022, the BS terminates the training process by sending a termination signal to the UE indicating the training phase is finished, in response to which the UE transitions to a normal operation phase 1060. In some embodiments, the training termination signal may be transmitted to the UE through dynamic signaling. In the normal operations phase 1060 the UE and BS may then communicate via the updated air interface.

In some embodiments, the information exchange procedure shown in FIG. 12 occurs at least partially in the Radio Resource Control (RRC) layer.

In some embodiments, the information exchange procedure shown in FIG. 12 occurs at least partially in a Medium Access Control (MAC) layer. For example, the information exchange signaling may be carried by a MAC control element (MAC CE) implemented as a special bit string in a logical channel ID (LCID) field of a MAC header.

In the example embodiment shown in FIG. 12, the AI/ML training is performed in the network and the results of the training are sent to the UE, which may be referred to as network oriented training. In other embodiments, training may take place jointly at the UE and in the network.

Figure 13:
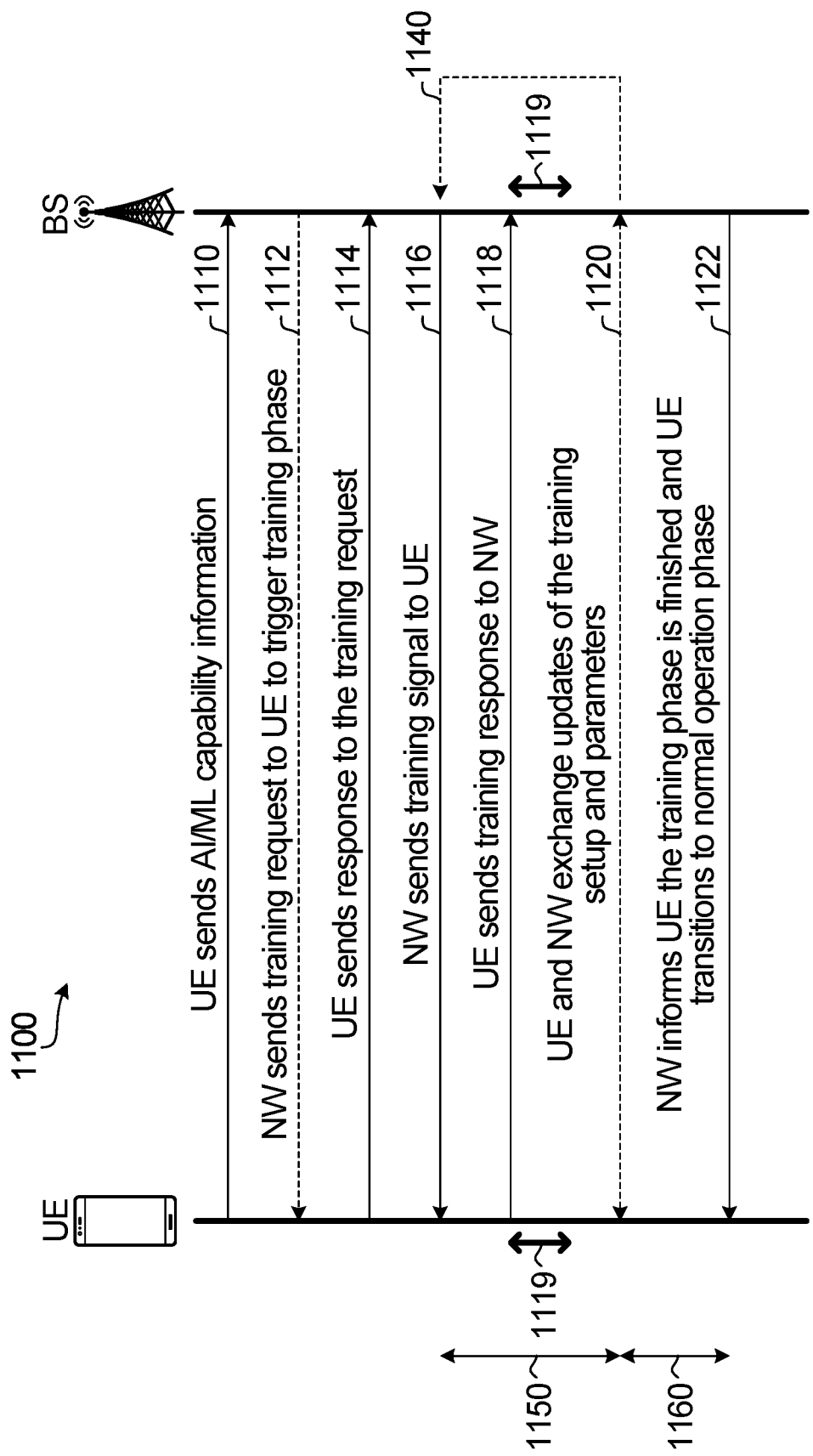
FIG. 13 illustrates another example of an over the air information exchange procedure for a training phase of machine learning components enabling device-specific tailoring/customization of an air interface, in accordance with an embodiment of this disclosure.

FIG. 13 is a signal flow diagram 1100 of an example of an over the air information exchange procedure for a training phase of machine learning components enabling device-specific tailoring/customization of an air interface, in accordance with an embodiment of this disclosure in which the training takes place jointly at the UE and BS.

In the signal flow diagram 1100, a UE and a BS or other network device are involved in an information exchange for an AI/ML training phase 1150. The information exchange procedure begins with the UE sending information indicating an AI/ML capability of the UE to the BS at 1110. The information indicating an AI/ML capability of the UE may include the same or similar information to that described above with reference to the example embodiment shown in FIG. 12, but in this example the information further also indicates that the UE is capable of joint AI/ML training with the network.

In some embodiments, the information sent by the UE to the BS at 1110 may be sent as part of an initial access procedure to access the network. In other embodiments, the information may also or instead be sent by the UE in response to a capability enquiry from the BS (not shown).

After receiving AI/ML capability information from the UE indicating that the UE supports network and UE joint AI/ML training, the BS sends a training request to the UE at 1112 to trigger a training phase 1150. In some embodiments, the training request may be sent to the UE through DCI (dynamic signaling) on a downlink control channel or on a data channel. For example, in some embodiments the training request may be sent to the UE with UE specific or UE common DCI. For example, UE common DCI may be used to send a training request to all UEs or a group of UEs. In some embodiments, the training request may be set to the UE via RRC signaling. In some embodiments, the training request may include initial training setting(s)/parameter(s), such as initial NN weights.

In some embodiments, the BS may also send AI/ML related information to the UE to facilitate joint training such as:
  Information indicating which AI/ML module is to be trained if there is more than one AI/ML module that is trainable;
  Information about the AI/ML algorithm and initial setting/parameters.

The AI/ML related information may be sent as part of the training request sent at 1112 or may be sent separately from the training request. The AI/ML related information sent to the UE, such as information indicating AI/ML algorithm(s) and setting/parameters, may have been selected by the BS or another network device based at least in part on the AI/ML capability information received from the UE. In some embodiments, the AI/ML related information may include an instruction for the UE to download initial AI/ML algorithm(s) and/or setting(s)/parameter(s), in response to which the UE may then download initial AI/ML algorithms and/or setting(s)/parameter(s) in accordance with the instruction.

In some embodiments, after the UE has received the training request and initial training information from the network, the UE may send a response to the training request to the BS, as indicated at 1114 in FIG. 13. This response may confirm that the UE has entered a training mode. However, such a response can be optional and may not be sent by a UE in some embodiments.

At 1116 the BS starts the training phase 1150 by sending a training signal that includes a training sequence or training data to the UE. In some embodiments, the BS may send a training sequence/training data to the UE after a certain predefined time gap following transmission of the training request at 1112. In other embodiments, the BS may immediately transmit a training sequence/training data to the UE after transmitting the training request at 1112. In still other embodiments, the BS may wait until it has received a response to the training request from the UE before transmitting the training sequence/training data to the UE. As noted above, in some embodiments the BS notifies the UE which AI/ML module(s)/component(s) is/are to be trained by including information in the training request that identifies one or more AI/ML modules/components or by sending such information to the UE in a separate communication. By doing so, the BS informs the UE which AI/ML modules(s)/component(s) is/are to be trained based on the training signal transmitted by the BS at 1116. Non-limiting examples of channels that may be used by the BS to send training sequences or training data to UE include those discussed above with reference to FIG. 12, namely a dynamic control channel, a data channel and/or RRC channel.

Similar to the UE in the example embodiment show in FIG. 12, the UE in the example embodiment shown in FIG. 13 may start to search for a training signal (e.g., a training sequence or training data) after sending back a response to the training request at 1114 or after receiving the training request at 1112 with or without a predefined time gap. The channel resource and the transmission parameters for the training signal, such as MCS and DMRS, can be predefined or preconfigured (e.g., by RRC signaling) or signaled by dynamic control signaling. In some embodiments, the training sequence/training data may be carried in a dynamic control channel directly (e.g., certain bits in a dynamic control channel may be reserved for carrying training sequence/training data).

At 1118 the UE sends a training response message to the BS. In some embodiments, the training response message may include feedback information indicating an updated training sequence for an iterative training process (e.g., for autoencoder based ML) or certain type(s) of measurement results to help further train or refine the training of a NN, e.g., for enforcement learning. In some embodiments, such measurements may include, for example, the error margin obtained by the UE in receiving the training sequence/data from the BS. For example the measurement results may include information indicating the mean square of errors and/or an error direction (e.g., error increase or decrease). In some embodiments, the training response message may also or instead include other feedback information, such as an adjustment step size and direction (e.g., increase or decrease by X amount, where X is the adjustment step size). In some cases, the measurement results or feedback may be provided implicitly. For example the adjustment of beamforming can be indicated by the beam direction of the feedback signal. In some embodiments, the training response message may be sent by the UE through an uplink (UL) control channel. In other embodiments, the training response message may be partially or entirely sent through an UL data channel.

In this embodiment, training of an AI/ML module that includes one or more AI/ML components takes place jointly in the network and at the UE, as indicated at 1119 in FIG. 13. For example, parameters of an AI/ML module, such as neural network weights, may be updated/modified based on measurement results returned by the UE for the training sequence/data that was transmitted by the BS.

In some embodiments, the UE and BS exchange updates of the training setup and parameters, such as neural network weights, in order to optimize one or more aspects of the air interface between the UE and BS, as indicated at 1120 in FIG. 13. In other embodiments, the UE and/or the BS may be able to update the training setup and parameters autonomously based on their own training process at 1119 without the further information exchange indicated at 1120.

In some embodiments this training process is done iteratively, as indicated at 1140, whereby the BS repeatedly transmits training sequence/data and the UE and BS iteratively refine AI/ML parameters based on training response messages from the UE. In some embodiments this iterative process may continue until one or more target criteria is satisfied or until a predefined number of iterations have occurred. In some embodiments, the training sequence/data may be updated during the iterative training process.

At 1122, the BS terminates the training process by sending a termination signal to the UE indicating the training phase is finished, in response to which the UE transitions to a normal operation phase 1160. In some embodiments, the UE may initiate termination of the training phase by sending a termination recommendation signal to the BS. In the normal operations phase 1160 the UE and BS may then communicate via the updated air interface.

In some embodiments, the AI/ML algorithms and/or parameters may have been pre-downloaded by the UE. In some embodiments, the AI/ML capability information the UE sends at 1110 may include information indicating pre-downloaded AI/ML algorithms and parameters. In such embodiments, the BS may transmit a download instruction to a UE to instruct the UE to download a selected AI/ML algorithm or parameters if the AI/ML capability information received from the UE indicates the selected AI/ML algorithm or parameters have not been pre-downloaded by the UE.

In some embodiments, the information exchange procedure shown in FIG. 13 occurs at least partially in the RRC layer.

In some embodiments, the information exchange procedure shown in FIG. 13 occurs at least partially in a MAC layer. For example, the information exchange signaling may be carried by a MAC CE implemented as a special bit string in a LCID field of a MAC header.

It should be understood that the specific AI/ML component architectures that may be used in embodiments of the present disclosure may be designed based on the particular application. For example, where an AI/ML component is implemented with a deep neural network (DNN), the specific DNN architecture that should be used for a given application (e.g., joint coding and modulation optimization or individual waveform generation optimization) may be standardized (e.g., in agreed upon industry standards). For example, standardization may include a standard definition of the type(s) of neural network to be used, and certain parameters of the neural network (e.g., number of layers, number of neurons in each layer, etc.). Standardization may be application-specific. For example, a table may be used to list the standard-defined neural network types and parameters to be used for specific applications. In the context of the wireless system 100 of FIG. 1, standardized definitions may be stored in the memory of the BS 170, to enable the BS 170 to select the appropriate DNN architecture and parameters to be trained for a particular wireless communication scenario.

As discussed above with respect to FIGS. 12 and 13, training of DNN(s) (e.g., a single DNN implementing coding, modulation and/or waveform generation, or separate DNNs for each) or other AI/ML components may be performed at a BS or jointly at a BS and a UE, and may be performed at the time of initial setup and association between the BS and UE. In some examples, it may be sufficient for the BS and/or the UE to train an AI/ML component, e.g., DNN(s), at the time of setup. As well, training or re-training may also be performed on-the-fly, for example in response to significant change in the UE or BS and/or the environment (e.g., addition of new UE(s), disassociation of a UE, significant change in UE mobility, change in UE state or significant change in channel, among other possibilities).

In some examples, training of the AI/ML components, such as DNNs, at the BS and/or UE may be performed offline, for example using data collected by the BS or UE. The collected data may represent different wireless communication scenarios, such as different times of day, different days of the week, different traffic levels, etc. Training may be performed for a particular scenario, to generate different sets of DNN weights for different scenarios. The different sets of weights may be stored in association with the different specific scenarios (e.g., in a look-up table), for example in the memory of the BS or UE. The BS or UE may then select and use a particular set of weights for the DNN(s), in accordance with the specific scenario. For example, the BS or UE may determine that it is handling communications for a weekend evening (e.g., using information from an internal clock and/or calendar) and use the corresponding set of weights to implement the DNN(s) for coding, modulation and/or waveform generation. This would result in the transmitter of the BS 170 performing coding, modulation and/or waveform generation suitable for a weekend evening.

In some embodiments, offline and on-the-fly training may be applied jointly. For example, on-the-fly re-training may be performed to update training that was previously performed offline. For example, a BS and/or UE may also retrain AI/ML components such as DNN(s) on-the-fly, in response to dynamic changes in the environment and/or in the UE or BS, as discussed above. Thus, the BS or UE may update the table of weights dynamically. In some examples, the table of weights may include sets of weights that are standardized (e.g., defined in standards for very common scenarios) and may also include sets of weights that are generated offline and/or on-the-fly for certain scenarios.

The BS may provide an indexed table of weights and associated scenarios to the UE. The BS may instruct the UE a selected set of weights to use, for example by indicating the corresponding index of a selected set of weights. The BS and/or UE may retrain their AI/ML components and update their tables of weights (e.g., in response to a new scenario) and communicate the updated tables to one another, e.g., on a periodic or aperiodic basis.

Figure 14:
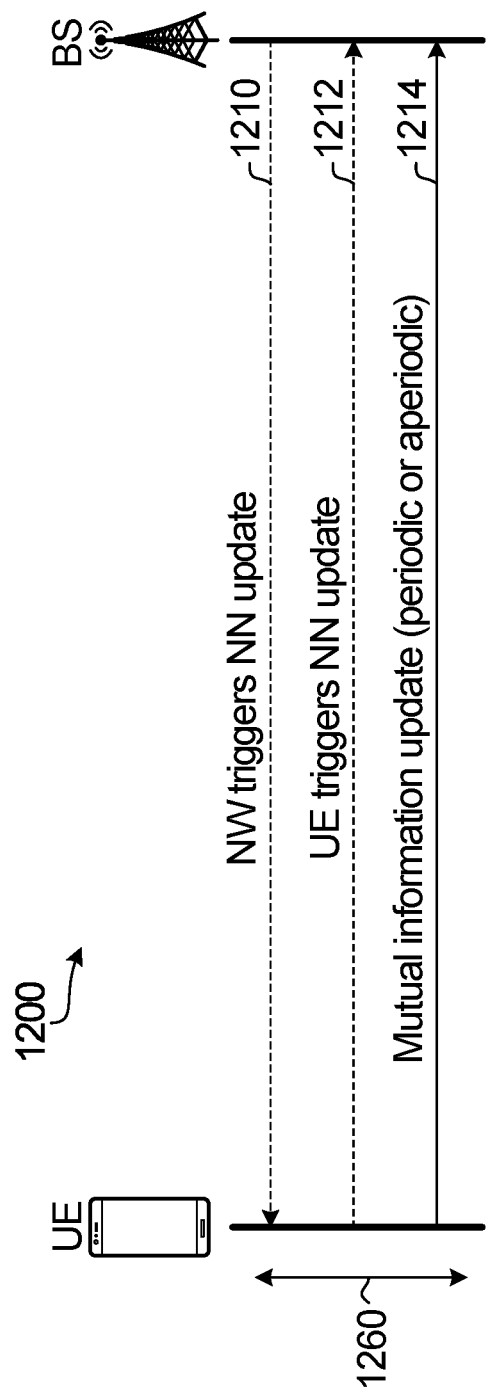
FIG. 14 illustrates an example of an over the air information exchange procedure for a normal operations phase of machine learning components enabling device-specific tailoring/customization of an air interface, in accordance with an embodiment of this disclosure.

FIG. 14 is a signal flow diagram 1200 of an example of an over the air information exchange procedure for a normal operations phase 1260 of machine learning components enabling on-the-fly device-specific tailoring/customization of an air interface, in accordance with an embodiment of this disclosure. In this embodiment, the on-the-fly update of AI/ML parameters may be triggered by the network during the normal operation phase 1260, as indicated at 1210. The network may trigger the on-the-fly update by sending updated AI/ML parameters, such as DNN weights. In this embodiment the on-the-fly update may also or instead be triggered by the UE during the normal operation phase 1260, as indicated at 1212. The UE may trigger the on-the-fly update by sending updated AI/ML parameters, such as DNN weights to the BS if the UE is capable of self-training. Otherwise, the trigger that the UE sends the BS at 1212 may simply comprise a request for an update from the BS. In addition or instead of being triggered by the BS and/or the UE, an on-the-fly update during the normal operation phase 1260 may occur on a periodic or aperiodic basis, and may involve a mutual information update exchange, as indicated at 1214.

Figure 15:
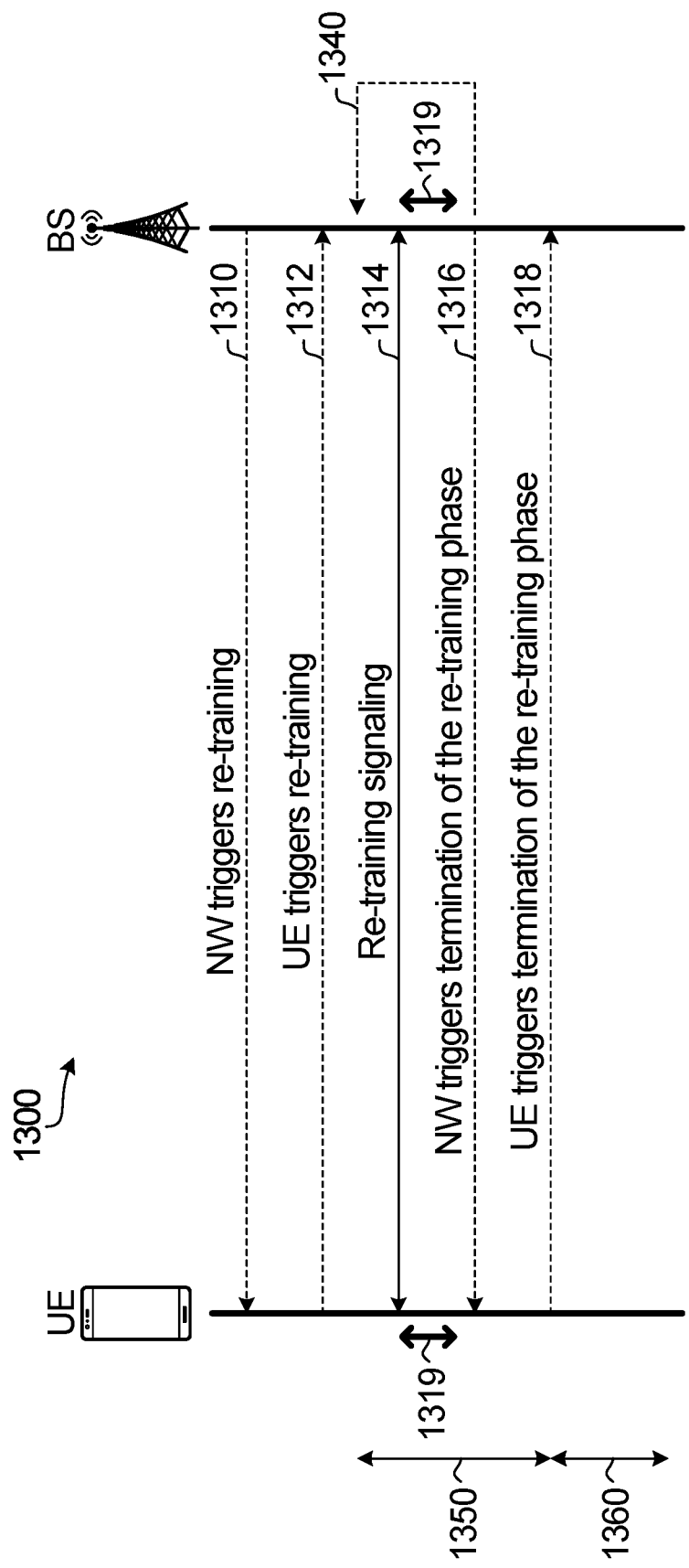
FIG. 15 illustrates an example of an over the air information exchange procedure for a re-training phase of machine learning components enabling device-specific tailoring/customization of an air interface, in accordance with an embodiment of this disclosure.

FIG. 15 is a signal flow diagram 1300 of an example of an over the air information exchange procedure for a re-training phase of machine learning components enabling device-specific tailoring/customization of an air interface, in accordance with an embodiment of this disclosure.

In the signal flow diagram 1300, a UE and a BS or other network device are involved in an information exchange for an AI/ML re-training phase 1350. In this embodiment, the re-training phase may be triggered by the network, as indicated at 1310. In some embodiments, the BS may trigger the re-training by sending a training request to the UE, e.g., through DCI, RRC or MAC signaling as discussed earlier with reference to FIGS. 12 and 13. In this embodiment the re-training phase may also or instead be triggered by the UE, as indicated at 1312. In either case, during the re-training phase 1350 the UE and BS exchange re-training signaling as indicated at 1314 in order to facilitate re-training of AI/ML components in the network and/or at the UE. For example, in some embodiments the re-training signaling may include information exchanges and signaling such as that indicated at 1016, 1018 and 1020 in FIG. 12 or at 1116, 1118 and 1120 in FIG. 13. In some embodiments, re-training of an AI/ML module that includes one or more AI/ML components may take place in the network or jointly in the network and at the UE, as indicated at 1319 in FIG. 15.

In some embodiments this re-training process is done iteratively, as indicated at 1340, whereby the BS repeatedly transmits training sequence/data and the UE and BS iteratively refine AI/ML parameters based on re-training response messages from the UE. In some embodiments this iterative process may continue until one or more target criteria is satisfied or until a predefined number of iterations have occurred. In some embodiments, the re-training sequence/data may be updated during the iterative re-training process.

At 1316, the BS terminates the re-training process by sending a termination signal to the UE indicating the re-training phase is finished, in response to which the UE transitions to a normal operation phase 1360. In some embodiments, the UE may instead initiate termination of the re-training phase by sending a termination recommendation signal to the BS, as indicated at 1318. In the normal operations phase 1360 the UE and BS may then communicate via the updated air interface resulting from the re-training.

The above discussion refers to examples where the network side training is performed by the BS. In other examples, AI/ML component training may not be performed by the BS. For example, referring again to FIG. 1, training may be performed by the core network 130 or elsewhere in the wireless system 100 (e.g., using cloud computing). A BS 170 may simply collect the relevant data and forward the data to the appropriate network entity (e.g., the core network 130) to perform the necessary training. The trained AI/ML component parameters, e.g., weights of trained DNN(s), may then be provided to the BS 170 and ED(s) 110.

Although the above discussion is in the context of the BS 170 in the role of a transmitter and the ED 110 in the role of a receiver, it should be understood that the transmitter and receiver roles may be reversed (e.g., for uplink communications). Further, it should be understood that the transmitter and receiver roles may be at two or more EDs 110a, 110b, 110c (e.g., for sidelink communications). The BS 170 (or core network 130 or other network entity) may perform the DNN training and may provide the trained weights to the ED 110 in order for the ED 110 to implement the DNN(s) for communicating with the BS 170.

EXAMPLE EMBODIMENTS

The following provides a non-limiting list of additional Example Embodiments of the present disclosure:
Example Embodiment 1. A method in a wireless communication network, the method comprising:
transmitting, by a first device, information regarding an artificial intelligence or machine learning (AI/ML) capability of the first device to a second device over a single air interface between the first device and the second device, the information regarding an AI/ML capability of the first device identifying whether the first device supports AI/ML for optimization of at least one air interface configuration over the single air interface.

Example Embodiment 2. The method of Example Embodiment 1, wherein the information regarding an AI/ML capability of the first device comprises information indicating the first device is capable of supporting a type and/or level of complexity of AI/ML.

Example Embodiment 3. The method of Example Embodiment 1 or 2, wherein the information regarding an AI/ML capability of the first device comprises information indicating whether the first device assists with an AI/ML training process for optimization of the at least one air interface configuration.

Example Embodiment 4. The method of any of Example Embodiments 1 to 3, wherein the information regarding an AI/ML capability of the first device comprises information indicating at least one component of the at least one air interface configuration for which the first device supports AI/ML optimization.

Example Embodiment 5. The method of Example Embodiment 4, wherein the at least one component of the at least one air interface configuration includes at least one of a coding component, a modulation component and a waveform component.

Example Embodiment 6. The method of Example Embodiment 4 or 5, wherein the information indicating at least one component of the at least one air interface configuration for which the first device supports AI/ML optimization further comprises information indicating whether the first device supports joint optimization of two or more components of the at least one air interface configuration.

Example Embodiment 7. The method of any of Example Embodiments 1 to 6, wherein transmitting the information regarding an AI/ML capability of the first device comprises at least one of:
    transmitting the information in response to receiving an enquiry; and
    transmitting the information as part of an initial network access procedure.

Example Embodiment 8. The method of any of Example Embodiments 1 to 7, further comprising:
    receiving an AI/ML training request from the second device; and
    after receiving the AI/ML training request, transitioning to an AI/ML training mode.

Example Embodiment 9. The method of Example Embodiment 8, wherein receiving the AI/ML training request comprises receiving the AI/ML training request through downlink control information (DCI) on a downlink control channel or RRC signaling or the combination of the DCI and RRC signaling.

Example Embodiment 10. The method of Example Embodiment 8 or 9, further comprising, transmitting a training request response to the second device to confirm that the first device has transitioned to the AI/ML training mode.

Example Embodiment 11. The method of any of Example Embodiments 1 to 10, further comprising receiving a training signal from the second device that includes a training sequence or training data for training at least one AI/ML module responsible for one or more components of the at least one air interface configuration.

Example Embodiment 12. The method of Example Embodiment 11, wherein receiving the training signal comprises receiving the training signal on a dynamic control channel.

Example Embodiment 13. The method of Example Embodiment 12, wherein the dynamic control channel includes a dynamic control information (DCI) field containing information indicating an AI/ML module that is to be trained.

Example Embodiment 14. The method of Example Embodiment 11, wherein receiving the training signal comprises receiving the training signal on a scheduled data channel, the method further comprising receiving scheduling information for the data channel on a dynamic control channel that includes a DCI field containing information indicating an AI/ML module that is to be trained.

Example Embodiment 15. The method of any of Example Embodiments 11 to 14, further comprising, after receiving the training signal, transmitting a training response message to the second device, the training response message including feedback information based on processing of the received training signal at the first device.

Example Embodiment 16. The method of Example Embodiment 15, wherein the feedback information included in the training response message includes an updated training sequence for an iterative training process.

Example Embodiment 17. The method of Example Embodiment 15 or 16, wherein the feedback information included in the training response message includes measurement results based on the received training signal.

Example Embodiment 18. The method of Example Embodiment 17, wherein the measurement results include an error margin obtained by the first device in receiving the training signal from the second device.

Example Embodiment 19. The method of any of Example Embodiments 15 to 18, further comprising, after transmitting the training response message, receiving AI/ML update information from the second device, the AI/ML update information including information indicating updated AI/ML parameters for an AI/ML module based on the feedback information provided by the first device.

Example Embodiment 20. The method of Example Embodiment 19, further comprising, updating the AI/ML module in accordance with the updated AI/ML parameters in order to update the at least one air interface configuration for receiving transmissions from the second device.

Example Embodiment 21. The method of any of Example Embodiments 15 to 18, further comprising:
    training one or more AI/ML modules at the first device based on the training signal received from the second device; and
    transmitting AI/ML update information to the second device, the AI/ML update information including information indicating updated AI/ML parameters for at least one of the one or more AI/ML modules based on the training performed by the first device.

Example Embodiment 22. The method of Example Embodiment 21, further comprising receiving AI/ML update information from the second device, the AI/ML update information from the second device including information indicating updated AI/ML parameters for at least one of the one or more AI/ML modules based on training of one or more AI/ML modules at the second device based on feedback information provided in the training response message.

Example Embodiment 23. The method of Example Embodiment 22, further comprising, updating the at least one air interface configuration for receiving transmissions from the second device by updating the one or more AI/ML modules in accordance with the updated AI/ML parameters based on the training performed by the first device and the updated AI/ML parameters received from the second device.

Example Embodiment 24. The method of any of Example Embodiments 1 to 23, further comprising:
  receiving a training termination signal from the second device; and
  after receiving the training termination signal, transitioning the first device from the training mode to a normal operations mode.

Example Embodiment 25. The method of any of Example Embodiments 1 to 24, wherein the first device is user equipment and the second device is a network device.

Example Embodiment 26. A method in a wireless communication network, the method comprising:
  receiving, by a second device, information regarding an artificial intelligence or machine learning (AI/ML) capability of a first device over a single air interface between the first device and the second device, the information regarding an AI/ML capability of the first device identifying whether the first device supports AI/ML for optimization of at least one air interface configuration over the single air interface; and
  transmitting an AI/ML training request to the first device based at least in part on the information regarding the AI/ML capability of the first device.

Example Embodiment 27. The method of Example Embodiment 26, wherein the information regarding an AI/ML capability of the first device comprises information indicating the first device is capable of supporting a type and/or level of complexity of AI/ML.

Example Embodiment 28. The method of Example Embodiment 26 or 27, wherein the information regarding an AI/ML capability of the first device comprises information indicating whether the first device assists with an AI/ML training process for optimization of the at least on air interface configuration.

Example Embodiment 29. The method of any of Example Embodiments 26 to 28, wherein the information regarding an AI/ML capability of the first device comprises information indicating at least one component of the at least one air interface configuration for which the first device supports AI/ML optimization.

Example Embodiment 30. The method of Example Embodiment 29, wherein the at least one component of the at least one air interface configuration includes at least one of a coding component, a modulation component and a waveform component.

Example Embodiment 31. The method of Example Embodiment 29 or 30, wherein the information indicating at least one component of the at least one air interface configuration for which the first device supports AI/ML optimization further comprises information indicating whether the first device supports joint optimization of two or more components of the at least one air interface configuration.

Example Embodiment 32. The method of any of Example Embodiments 26 to 31, wherein receiving the information regarding an AI/ML capability of the first device comprises receiving the information as part of an initial network access procedure for the first device.

Example Embodiment 33. The method of any of Example Embodiments 26 to 32, wherein transmitting the AI/ML training request comprises transmitting the AI/ML training request through downlink control information (DCI) on a downlink control channel or RRC signaling or the combination of the DCI and RRC signaling.

Example Embodiment 34. The method of Example Embodiment 33, further comprising, receiving a training request response from the device confirming that the device has transitioned to an AI/ML training mode.

Example Embodiment 35. The method of any of Example Embodiments 26 to 34, further comprising transmitting a training signal to the first device, the training signal including a training sequence or training data for training at least one AI/ML module responsible for one or more components of the at least one air interface configuration.

Example Embodiment 36. The method of Example Embodiment 35, wherein transmitting the training signal comprises transmitting the training signal on a dynamic control channel.

Example Embodiment 37. The method of Example Embodiment 36, wherein the dynamic control channel includes a dynamic control information (DCI) field containing information indicating an AI/ML module that is to be trained.

Example Embodiment 38. The method of Example Embodiment 35, wherein transmitting the training signal comprises transmitting the training signal on a scheduled data channel.

Example Embodiment 39. The method of Example Embodiment 38, further comprising transmitting scheduling information for the data channel on a dynamic control channel that includes a DCI field containing information indicating an AI/ML module that is to be trained.

Example Embodiment 40. The method of any of Example Embodiments 35 to 39, further comprising receiving a training response message from the first device, the training response message including feedback information based on processing of the received training signal at the first device.

Example Embodiment 41. The method of Example Embodiment 40, wherein the feedback information included in the training response message includes an updated training sequence for an iterative training process.

Example Embodiment 42. The method of Example Embodiment 40 or 41, wherein the feedback information included in the training response message includes measurement results based on the received training signal.

Example Embodiment 43. The method of Example Embodiment 42, wherein the measurement results include an error margin obtained by the first device in receiving the training signal.

Example Embodiment 44. The method of any of Example Embodiments 40 to 43, further comprising:
  training one or more AI/ML modules based on the feedback information provided in the training response message from the first device.

Example Embodiment 45. The method of Example Embodiment 44, further comprising:
  transmitting AI/ML update information to the first device, the AI/ML update information including information indicating updated AI/ML parameters for at least one of the one or more AI/ML modules based on the training.

Example Embodiment 46. The method of any of Example Embodiments 40 to 45, further comprising:
  receiving AI/ML update information from the first device, the AI/ML update information from the first device including information indicating updated AI/ML parameters for at least one of the one or more AI/ML modules based on training of one or more AI/ML modules at the first device based on the training signal.

Example Embodiment 47. The method of Example Embodiment 46, further comprising updating the at least one air interface configuration for transmitting to the first device by updating the one or more AI/ML modules in accordance with the updated AI/ML parameters transmitted to the first device and the updated AI/ML parameters received from the first device.

Example Embodiment 48. The method of any of Example Embodiments 26 to 47, further comprising:
transmitting a training termination signal to the first device to indicate that a training phase has finished.
Example Embodiment 49. The method of any of Example Embodiments 26 to 48, wherein the first device is user equipment and the second device is a network device.
Example Embodiment 50. An apparatus comprising:
a wireless interface;
a processor operatively coupled to the wireless interface; and
a computer readable storage medium operatively coupled to the processor, the computer readable storage medium storing programming for execution by the processor, the programming comprising instructions to:
transmit, from a first device via the wireless interface, information regarding an artificial intelligence or machine learning (AI/ML) capability of the first device to a second device over a single air interface between the first device and the second device, the information regarding an AI/ML capability of the first device identifying whether the first device supports AI/ML for optimization of at least one air interface configuration over the single air interface.
Example Embodiment 51. The apparatus of Example Embodiment 50, wherein the information regarding an AI/ML capability of the first device comprises information indicating the first device is capable of supporting a type and/or level of complexity of AI/ML.
Example Embodiment 52. The apparatus of Example Embodiment 50 or 51, wherein the information regarding an AI/ML capability of the first device comprises information indicating whether the first device assists with an AI/ML training process for optimization of the at least one air interface configuration.
Example Embodiment 53. The apparatus of any of Example Embodiments 50 to 52, wherein the information regarding an AI/ML capability of the first device comprises information indicating at least one component of the at least one air interface configuration for which the first device supports AI/ML optimization.
Example Embodiment 54. The apparatus of Example Embodiment 53, wherein the at least one component of the at least one air interface configuration includes at least one of a coding component, a modulation component and a waveform component.
Example Embodiment 55. The apparatus of Example Embodiment 53 or 54, wherein the information indicating at least one component of the at least one air interface configuration for which the first device supports AI/ML optimization further comprises information indicating whether the first device supports joint optimization of two or more components of the at least one air interface configuration.
Example Embodiment 56. The apparatus of any of Example Embodiments 50 to 55, wherein the instructions to transmit the information regarding an AI/ML capability of the first device comprises at least one of:
instructions to transmit the information in response to receiving an enquiry; and
instructions to transmit the information as part of an initial network access procedure.
Example Embodiment 57. The apparatus of any of Example Embodiments 50 to 56, wherein the programming further comprises instructions to:
receive an AI/ML training request from the second device; and
after receiving the AI/ML training request, transition to an AI/ML training mode.
Example Embodiment 58. The apparatus of Example Embodiment 57, wherein the instructions to receive the AI/ML training request comprises instructions to receive the AI/ML training request through downlink control information (DCI) on a downlink control channel or RRC signaling or the combination of the DCI and RRC signaling.
Example Embodiment 59. The apparatus of Example Embodiment 57 or 58, wherein the programming further comprises instructions to transmit a training request response to the second device to confirm that the first device has transitioned to the AI/ML training mode.
Example Embodiment 60. The apparatus of any of Example Embodiments 50 to 59, wherein the programming further comprises instructions to receive a training signal from the second device that includes a training sequence or training data for training at least one AI/ML module responsible for one or more components of the at least one air interface configuration.
Example Embodiment 61. The apparatus of Example Embodiment 60, wherein the instructions to receive the training signal comprise instructions to receive the training signal on a dynamic control channel.
Example Embodiment 62. The apparatus of Example Embodiment 61, wherein the dynamic control channel includes a dynamic control information (DCI) field containing information indicating an AI/ML module that is to be trained.
Example Embodiment 63. The apparatus of Example Embodiment 60, wherein the instructions to receive the training signal comprise instructions to receive the training signal on a scheduled data channel, the program further comprising instructions to receive scheduling information for the data channel on a dynamic control channel that includes a DCI field containing information indicating an AI/ML module that is to be trained.
Example Embodiment 64. The apparatus of any of Example Embodiments 60 to 63, wherein the programming further comprises instructions to:
transmit a training response message to the second device after receiving the training signal, the training response message including feedback information based on processing of the received training signal at the first device.
Example Embodiment 65. The apparatus of Example Embodiment 64, wherein the feedback information included in the training response message includes an updated training sequence for an iterative training process.
Example Embodiment 66. The apparatus of Example Embodiment 64 or 65, wherein the feedback information included in the training response message includes measurement results based on the received training signal.
Example Embodiment 67. The apparatus of Example Embodiment 66, wherein the measurement results include an error margin obtained by the first device in receiving the training signal from the second device.
Example Embodiment 68. The apparatus of any of Example Embodiments 64 to 67, wherein the programming further comprises instructions to:
receive AI/ML update information from the second device after transmitting the training response message, the AI/ML update information including information indicating updated AI/ML parameters for an AI/ML module based on the feedback information provided by the first device.
Example Embodiment 69. The apparatus of Example Embodiment 68, wherein the programming further comprises instructions to update the AI/ML module in accordance with the updated AI/ML parameters in order to update the at least one air interface configuration for receiving transmissions from the second device.

Example Embodiment 70. The apparatus of any of Example Embodiments 64 to 67, wherein the programming further comprises instructions to:
train one or more AI/ML modules at the first device based on the training signal received from the second device; and
transmit AI/ML update information to the second device, the AI/ML update information including information indicating updated AI/ML parameters for at least one of the one or more AI/ML modules based on the training performed by the first device.

Example Embodiment 71. The apparatus of Example Embodiment 70, wherein the programming further comprises instructions to receive AI/ML update information from the second device, the AI/ML update information from the second device including information indicating updated AI/ML parameters for at least one of the one or more AI/ML modules based on training of one or more AI/ML modules at the second device based on feedback information provided in the training response message.

Example Embodiment 72. The apparatus of Example Embodiment 71, wherein the programming further comprises instructions to update the at least one air interface configuration for receiving transmissions from the second device by updating the one or more AI/ML modules in accordance with the updated AI/ML parameters based on the training performed by the first device and the updated AI/ML parameters received from the second device.

Example Embodiment 73. The apparatus of any of Example Embodiments 50 to 72, wherein the programming further comprises instructions to:
receive a training termination signal from the second device; and
after receiving the training termination signal, transition the first device from the training mode to a normal operations mode.

Example Embodiment 74. The apparatus of any of Example Embodiments 50 to 73, wherein the first device is user equipment and the second device is a network device.

Example Embodiment 75. An apparatus comprising:
a wireless interface;
a processor operatively coupled to the wireless interface; and
a computer readable storage medium operatively coupled to the processor, the computer readable storage medium storing programming for execution by the processor, the programming comprising instructions to:
receive, by a second device via the wireless interface, information regarding an artificial intelligence or machine learning (AI/ML) capability of a first device over a single air interface between the first device and the second device, the information regarding an AI/ML capability of the first device identifying whether the first device supports AI/ML for optimization of at least one air interface configuration over the single air interface; and
transmit an AI/ML training request to the first device based at least in part on the information regarding the AI/ML capability of the first device.

Example Embodiment 76. The apparatus of Example Embodiment 75, wherein the information regarding an AI/ML capability of the first device comprises information indicating the first device is capable of supporting a type and/or level of complexity of AI/ML.

Example Embodiment 77. The apparatus of Example Embodiment 75 or 76, wherein the information regarding an AI/ML capability of the first device comprises information indicating whether the first device assists with an AI/ML training process for optimization of the at least on air interface configuration.

Example Embodiment 78. The apparatus of any of Example Embodiments 75 to 77, wherein the information regarding an AI/ML capability of the first device comprises information indicating at least one component of the at least one air interface configuration for which the first device supports AI/ML optimization.

Example Embodiment 79. The apparatus of Example Embodiment 78, wherein the at least one component of the at least one air interface configuration includes at least one of a coding component, a modulation component and a waveform component.

Example Embodiment 80. The apparatus of Example Embodiment 78 or 79, wherein the information indicating at least one component of the at least one air interface configuration for which the first device supports AI/ML optimization further comprises information indicating whether the first device supports joint optimization of two or more components of the at least one air interface configuration.

Example Embodiment 81. The apparatus of any of Example Embodiments 75 to 80, wherein receiving the information regarding an AI/ML capability of the first device comprises receiving the information as part of an initial network access procedure for the first device.

Example Embodiment 82. The apparatus of any of Example Embodiments 75 to 81, wherein transmitting the AI/ML training request comprises transmitting the AI/ML training request through downlink control information (DCI) on a downlink control channel or RRC signaling or the combination of the DCI and RRC signaling.

Example Embodiment 83. The apparatus of Example Embodiment 82, wherein the programming further comprises instructions to receive a training request response from the device confirming that the device has transitioned to an AI/ML training mode.

Example Embodiment 84. The apparatus of any of Example Embodiments 75 to 83, wherein the programming further comprises instructions to transmit a training signal to the first device, the training signal including a training sequence or training data for training at least one AI/ML module responsible for one or more components of the at least one air interface configuration.

Example Embodiment 85. The apparatus of Example Embodiment 84, wherein transmitting the training signal comprises transmitting the training signal on a dynamic control channel.

Example Embodiment 86. The apparatus of Example Embodiment 85, wherein the dynamic control channel includes a dynamic control information (DCI) field containing information indicating an AI/ML module that is to be trained.

Example Embodiment 87. The apparatus of Example Embodiment 84, wherein transmitting the training signal comprises transmitting the training signal on a scheduled data channel.

Example Embodiment 88. The apparatus of Example Embodiment 87, wherein the programming further comprises instructions to transmit scheduling information for the data channel on a dynamic control channel that includes a DCI field containing information indicating an AI/ML module that is to be trained.

Example Embodiment 89. The apparatus of any of Example Embodiments 84 to 88, wherein the programming further comprises instructions to receive a training response message from the first device, the training response message including feedback information based on processing of the received training signal at the first device.

Example Embodiment 90. The apparatus of Example Embodiment 89, wherein the feedback information included in the training response message includes an updated training sequence for an iterative training process.

Example Embodiment 91. The apparatus of Example Embodiment 89 or 90, wherein the feedback information included in the training response message includes measurement results based on the received training signal.

Example Embodiment 92. The apparatus of Example Embodiment 91, wherein the measurement results include an error margin obtained by the first device in receiving the training signal.

Example Embodiment 93. The apparatus of any of Example Embodiments 89 to 92, wherein the programming further comprises instructions to:
train one or more AI/ML modules based on the feedback information provided in the training response message from the first device.

Example Embodiment 94. The apparatus of Example Embodiment 93, wherein the programming further comprises instructions to:
transmit AI/ML update information to the first device, the AI/ML update information including information indicating updated AI/ML parameters for at least one of the one or more AI/ML modules based on the training.

Example Embodiment 95. The apparatus of any of Example Embodiments 89 to 94, wherein the programming further comprises instructions to:
receive AI/ML update information from the first device, the AI/ML update information from the first device including information indicating updated AI/ML parameters for at least one of the one or more AI/ML modules based on training of one or more AI/ML modules at the first device based on the training signal.

Example Embodiment 96. The apparatus of Example Embodiment 95, wherein the programming further comprises instructions to update the at least one air interface configuration for transmitting to the first device by updating the one or more AI/ML modules in accordance with the updated AI/ML parameters transmitted to the first device and the updated AI/ML parameters received from the first device.

Example Embodiment 97. The apparatus of any of Example Embodiments 75 to 96, wherein the programming further comprises instructions to:
transmit a training termination signal to the first device to indicate that a training phase has finished.

Example Embodiment 98. The apparatus of any of Example Embodiments 75 to 97, wherein the first device is user equipment and the second device is a network device.

Example Embodiment 99. An apparatus comprising:
a transmitting module configured to transmit, from a first device, information regarding an artificial intelligence or machine learning (AI/ML) capability of the first device to a second device over an air interface between the first device and the second device, the information regarding an AI/ML capability of the first device identifying whether the first device supports AI/ML for optimization of at least one air interface component over the air interface.

Example Embodiment 100. The apparatus of Example Embodiment 99, wherein the information regarding an AI/ML capability of the first device comprises information indicating the first device is capable of supporting a type and/or level of complexity of AI/ML.

Example Embodiment 101. The apparatus of Example Embodiment 99 or 100, wherein the information regarding an AI/ML capability of the first device comprises information indicating whether the first device assists with an AI/ML training process for optimization of the at least one air interface component.

Example Embodiment 102. The apparatus of any of Example Embodiments 99 to 101, wherein the information regarding an AI/ML capability of the first device comprises information indicating at least one component of the at least one air interface component for which the first device supports AI/ML optimization.

Example Embodiment 103. The apparatus of Example Embodiment 102, wherein the at least one air interface component includes at least one of a coding component, a modulation component and a waveform component.

Example Embodiment 104. The apparatus of Example Embodiment 102 or 103, wherein the information indicating at least one component of the at least one air interface component for which the first device supports AI/ML optimization further comprises information indicating whether the first device supports joint optimization of two or more components of the at least one air interface component.

Example Embodiment 105. The apparatus of any of Example Embodiments 99 to 104, wherein the transmitting module is configured to transmit the information regarding an AI/ML capability of the first device in response to receiving an enquiry or as part of an initial network access procedure.

Example Embodiment 106. The apparatus of any of Example Embodiments 99 to 105, further comprising:
a receiving module configured to receive an AI/ML training request from the second device; and
a processing module configured to transition to an AI/ML training mode after the AI/ML training request is received.

Example Embodiment 107. The apparatus of Example Embodiment 106, wherein the receiving module is configured to receive the AI/ML training request through downlink control information (DCI) on a downlink control channel or RRC signaling or the combination of the DCI and RRC signaling.

Example Embodiment 108. The apparatus of Example Embodiment 106 or 107, wherein the transmitting module is configured to transmit a training request response to the second device to confirm that the first device has transitioned to the AI/ML training mode.

Example Embodiment 109. The apparatus of any of Example Embodiments 99 to 108, wherein the receiving module is configured to receive a training signal from the second device that includes a training sequence or training data for training at least one AI/ML module responsible for one or more components of the at least one air interface component.

Example Embodiment 110. The apparatus of Example Embodiment 109, wherein the receiving module is configured to receive the training signal on a dynamic control channel.

Example Embodiment 111. The apparatus of Example Embodiment 110, wherein the dynamic control channel includes a dynamic control information (DCI) field containing information indicating an AI/ML module that is to be trained.

Example Embodiment 112. The apparatus of Example Embodiment 109, wherein the receiving module is configured to:
  receive the training signal on a scheduled data channel; and
  receive scheduling information for the data channel on a dynamic control channel that includes a DCI field containing information indicating an AI/ML module that is to be trained.

Example Embodiment 113. The apparatus of any of Example Embodiments 109 to 112, wherein the transmitting module is configured to:
  transmit a training response message to the second device after receiving the training signal, the training response message including feedback information based on processing of the received training signal at the first device.

Example Embodiment 114. The apparatus of Example Embodiment 113, wherein the feedback information included in the training response message includes an updated training sequence for an iterative training process.

Example Embodiment 115. The apparatus of Example Embodiment 113 or 114, wherein the feedback information included in the training response message includes measurement results based on the received training signal.

Example Embodiment 116. The apparatus of Example Embodiment 115, wherein the measurement results include an error margin obtained by the first device in receiving the training signal from the second device.

Example Embodiment 117. The apparatus of any of Example Embodiments 113 to 116, wherein the receiving module is configured to:
  receive AI/ML update information from the second device after transmitting the training response message, the AI/ML update information including information indicating updated AI/ML parameters for an AI/ML module based on the feedback information provided by the first device.

Example Embodiment 118. The apparatus of Example Embodiment 117, further comprising a processing module configured to update the AI/ML module in accordance with the updated AI/ML parameters in order to update the at least one air interface component for receiving transmissions from the second device.

Example Embodiment 119. The apparatus of any of Example Embodiments 113 to 116, further comprising a processing module configured to train one or more AI/ML modules at the first device based on the training signal received from the second device, wherein the transmitting module is configured to transmit AI/ML update information to the second device, the AI/ML update information including information indicating updated AI/ML parameters for at least one of the one or more AI/ML modules based on the training performed by the first device.

Example Embodiment 120. The apparatus of Example Embodiment 119, wherein the receiving module is configured to receive AI/ML update information from the second device, the AI/ML update information from the second device including information indicating updated AI/ML parameters for at least one of the one or more AI/ML modules based on training of one or more AI/ML modules at the second device based on feedback information provided in the training response message.

Example Embodiment 121. The apparatus of Example Embodiment 120, wherein the processing module is configured to update the at least one air interface component for receiving transmissions from the second device by updating the one or more AI/ML modules in accordance with the updated AI/ML parameters based on the training performed by the first device and the updated AI/ML parameters received from the second device.

Example Embodiment 122. The apparatus of any of Example Embodiments 99 to 121, wherein the receiving module is configured to receive a training termination signal from the second device, and the processing module is configured to transition the first device from the training mode to a normal operations mode after the training termination signal is received.

Example Embodiment 123. The apparatus of any of Example Embodiments 99 to 122, wherein the first device is user equipment and the second device is a network device.

Example Embodiment 124. An apparatus comprising:
  a receiving module configured to receive, by a second device, information regarding an artificial intelligence or machine learning (AI/ML) capability of a first device over an air interface between the first device and the second device, the information regarding an AI/ML capability of the first device identifying whether the first device supports AI/ML for optimization of at least one air interface component over the air interface; and
  a transmitting module configured to transmit an AI/ML training request to the first device based at least in part on the information regarding the AI/ML capability of the first device.

Example Embodiment 125. The apparatus of Example Embodiment 124, wherein the information regarding an AI/ML capability of the first device comprises information indicating the first device is capable of supporting a type and/or level of complexity of AI/ML.

Example Embodiment 126. The apparatus of Example Embodiment 124 or 125, wherein the information regarding an AI/ML capability of the first device comprises information indicating whether the first device assists with an AI/ML training process for optimization of the at least on air interface component.

Example Embodiment 127. The apparatus of any of Example Embodiments 124 to 126, wherein the information regarding an AI/ML capability of the first device comprises information indicating at least one component of the at least one air interface component for which the first device supports AI/ML optimization.

Example Embodiment 128. The apparatus of Example Embodiment 127, wherein the at least one component of the at least one air interface component includes at least one of a coding component, a modulation component and a waveform component.

Example Embodiment 129. The apparatus of Example Embodiment 127 or 128, wherein the information indicating at least one component of the at least one air interface component for which the first device supports AI/ML optimization further comprises information indicating whether the first device supports joint optimization of two or more components of the at least one air interface component.

Example Embodiment 130. The apparatus of any of Example Embodiments 124 to 129, wherein receiving the information regarding an AI/ML capability of the first device comprises receiving the information as part of an initial network access procedure for the first device.

Example Embodiment 131. The apparatus of any of Example Embodiments 124 to 130, wherein transmitting the AI/ML training request comprises transmitting the AI/ML training request through downlink control information (DCI) on a downlink control channel or RRC signaling or the combination of the DCI and RRC signaling.

Example Embodiment 132. The apparatus of Example Embodiment 131, wherein the receiving module is configured to receive a training request response from the device confirming that the device has transitioned to an AI/ML training mode.

Example Embodiment 133. The apparatus of any of Example Embodiments 124 to 132, wherein the transmitting module is configured to transmit a training signal to the first device, the training signal including a training sequence or training data for training at least one AI/ML module responsible for one or more components of the at least one air interface component.

Example Embodiment 134. The apparatus of Example Embodiment 133, wherein transmitting the training signal comprises transmitting the training signal on a dynamic control channel.

Example Embodiment 135. The apparatus of Example Embodiment 134, wherein the dynamic control channel includes a dynamic control information (DCI) field containing information indicating an AI/ML module that is to be trained.

Example Embodiment 136. The apparatus of Example Embodiment 133, wherein transmitting the training signal comprises transmitting the training signal on a scheduled data channel.

Example Embodiment 137. The apparatus of Example Embodiment 136, wherein the transmitting module is configured to transmit scheduling information for the data channel on a dynamic control channel that includes a DCI field containing information indicating an AI/ML module that is to be trained.

Example Embodiment 138. The apparatus of any of Example Embodiments 133 to 137, wherein the receiving module is configured to receive a training response message from the first device, the training response message including feedback information based on processing of the received training signal at the first device.

Example Embodiment 139. The apparatus of Example Embodiment 138, wherein the feedback information included in the training response message includes an updated training sequence for an iterative training process.

Example Embodiment 140. The apparatus of Example Embodiment 138 or 139, wherein the feedback information included in the training response message includes measurement results based on the received training signal.

Example Embodiment 141. The apparatus of Example Embodiment 140, wherein the measurement results include an error margin obtained by the first device in receiving the training signal.

Example Embodiment 142. The apparatus of any of Example Embodiments 138 to 141, further comprising a processing module configured to train one or more AI/ML modules based on the feedback information provided in the training response message from the first device.

Example Embodiment 143. The apparatus of Example Embodiment 142, wherein the transmitting module is configured to:

transmit AI/ML update information to the first device, the AI/ML update information including information indicating updated AI/ML parameters for at least one of the one or more AI/ML modules based on the training.

Example Embodiment 144. The apparatus of any of Example Embodiments 133 to 143, wherein the receiving module is configured to:

receive AI/ML update information from the first device, the AI/ML update information from the first device including information indicating updated AI/ML parameters for at least one of the one or more AI/ML modules based on training of one or more AI/ML modules at the first device based on the training signal.

Example Embodiment 145. The apparatus of Example Embodiment 144, further comprising a processing module configured to update the at least one air interface component for transmitting to the first device by updating the one or more AI/ML modules in accordance with the updated AI/ML parameters transmitted to the first device and the updated AI/ML parameters received from the first device.

Example Embodiment 146. The apparatus of any of Example Embodiments 124 to 145, wherein the transmitting module is configured to transmit a training termination signal to the first device to indicate that a training phase has finished.

Example Embodiment 147. The apparatus of any of Example Embodiments 124 to 146, wherein the first device is user equipment and the second device is a network device.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method in a wireless communication network, the method comprising:

transmitting, by a first device, information regarding an artificial intelligence or machine learning (AI/ML) capability of the first device to a second device over an air interface between the first device and the second device, the information regarding an AI/ML capability of the first device identifying whether the first device supports AI/ML for optimization of at least one air interface component over the air interface, the at least one air interface component comprising one or more baseband signal processing components of the air interface;

receiving, by the first device, an AI/ML training request from the second device, the training request being based at least in part on the information regarding the AI/ML capability of the first device;

after receiving the AI/ML training request, communicating with the second device over the air interface as part of an AI/ML training process to train an AI/ML component of the first device to optimize at least one of the baseband signal processing components of the air interface, wherein training the AI/ML component comprises training the AI/ML component to optimize one or more baseband signal processing functions in a receive chain or a transmit chain of the first device; and after the AI/ML component of the first device is trained, using the trained AI/ML component to optimize one or more of the baseband signal processing functions in the receive chain or the transmit chain of the first device for communication with the second device over the air interface.

2. The method of claim 1, wherein the information regarding an AI/ML capability of the first device comprises information indicating at least one of the following:

the first device is capable of supporting a type and/or level of complexity of AI/ML;

whether the first device assists with the AI/ML training process for optimization of the at least one air interface component;

at least one component of the at least one air interface component for which the first device supports AI/ML optimization.

3. The method of claim 2, wherein the information indicating at least one component of the at least one air interface component for which the first device supports AI/ML optimization further comprises information indicating whether the first device supports joint optimization of two or more air interface components.

4. The method of claim 1, wherein the one or more baseband signal processing components of the air interface includes at least one of a coding component, a modulation component and a waveform component.

5. The method of claim 1, wherein transmitting the information regarding an AI/ML capability of the first device comprises at least one of:

transmitting the information in response to receiving an enquiry; and transmitting the information as part of an initial network access procedure.

6. A method in a wireless communication network, the method comprising:

receiving, by a second device, information regarding an artificial intelligence or machine learning (AI/ML) capability of a first device over an air interface between the first device and the second device, the information regarding an AI/ML capability of the first device identifying whether the first device supports AI/ML for optimization of at least one air interface component over the air interface, the at least one air interface component comprising one or more baseband signal processing components of the air interface;

transmitting an AI/ML training request to the first device based at least in part on the information regarding the AI/ML capability of the first device;

after transmitting the AI/ML training request, communicating with the first device over the air interface as part of an AI/ML training process to train an AI/ML component of the second device to optimize at least one of the baseband signal processing components of the air interface, wherein training the AI/ML component comprises training the AI/ML component to optimize one or more baseband signal processing functions in a receive chain or a transmit chain of the second device; and after the AI/ML component of the second device is trained, using the trained AI/ML component to optimize one or more of the baseband signal processing functions in the receive chain or the transmit chain of the second device for communication with the first device over the air interface.

7. The method of claim 6, wherein the information regarding an AI/ML capability of the first device comprises information indicating at least one of the following:

the first device is capable of supporting a type and/or level of complexity of AI/ML;

whether the first device assists with the AI/ML training process for optimization of the at least one air interface component;

at least one component of the at least one air interface component for which the first device supports AI/ML optimization.

8. The method of claim 7, wherein the information indicating at least one component of the at least one air interface component for which the first device supports AI/ML optimization further comprises information indicating whether the first device supports joint optimization of two or more components of the at least one air interface component.

9. The method of claim 6, wherein the one or more baseband signal processing components of the air interface includes at least one of a coding component, a modulation component and a waveform component.

10. The method of claim 6, wherein receiving the information regarding an AI/ML capability of the first device comprises receiving the information as part of an initial network access procedure for the first device.

11. The method of claim 6, wherein transmitting the AI/ML training request comprises transmitting the AI/ML training request through downlink control information (DCI) on a downlink control channel or RRC signaling or the combination of the DCI and RRC signaling.

12. The method of claim 11, further comprising, receiving a training request response from the device confirming that the device has transitioned to an AI/ML training mode.

13. The method of claim 6, further comprising:

transmitting a training termination signal to the first device to indicate that a training phase has finished.

14. An apparatus comprising:

at least one processor; and a computer readable storage medium operatively coupled to the at least one processor, the computer readable storage medium storing programming for execution by the at least one processor, the programming comprising instructions to:

transmit, from the apparatus, information regarding an artificial intelligence or machine learning (AI/ML)

capability of the apparatus to a network device over an air interface between the apparatus and the network device, the information regarding an AI/ML capability of the apparatus identifying whether the apparatus supports AI/ML for optimization of at least one air interface component over the air interface, the at least one air interface component comprising one or more baseband signal processing components of the air interface;

receive an AI/ML training request from the network device, the training request being based at least in part on the information regarding the AI/ML capability of the apparatus;

after receiving the AI/ML training request, communicate with the network device over the air interface as part of an AI/ML training process to train an AI/ML component of the apparatus to optimize at least one of the baseband signal processing components of the air interface, wherein training the AI/ML component comprises training the AI/ML component to optimize one or more baseband signal processing functions in a receive chain or a transmit chain of the apparatus; and after the AI/ML component of the apparatus is trained, use the trained AI/ML component to optimize one or more of the baseband signal processing functions in the receive chain or the transmit chain of the apparatus for communication with the network device over the air interface.

15. The apparatus of claim 14, wherein the information regarding an AI/ML capability of the apparatus comprises information indicating at least one of the following:

the apparatus is capable of supporting a type and/or level of complexity of AI/ML;

whether the apparatus assists with the AI/ML training process for optimization of the at least one air interface component; and at least one component of the at least one air interface component for which the apparatus supports AI/ML optimization.

16. The apparatus of claim 15, wherein the information indicating at least one component of the at least one air interface component for which the apparatus supports AI/ML optimization further comprises information indicating whether the apparatus supports joint optimization of two or more components of the at least one air interface component.

17. The apparatus of claim 14, wherein the one or more baseband signal processing components of the air interface includes at least one of a coding component, a modulation component and a waveform component.

18. A network apparatus comprising:
at least one processor; and
a computer readable storage medium operatively coupled to the at least processor, the computer readable storage medium storing programming for execution by the at least processor, the programming comprising instructions to:

receive, by the network apparatus information regarding an artificial intelligence or machine learning (AI/ML) capability of a first device over an air interface between the first device and the network apparatus, the information regarding an AI/ML capability of the first device identifying whether the first device supports AI/ML for optimization of at least one air interface component over the air interface, the at least one air interface component comprising one or more baseband signal processing components of the air interface;

transmit an AI/ML training request to the first device based at least in part on the information regarding the AI/ML capability of the first device;

after transmitting the AI/ML training request, communicate with the first device over the air interface as part of an AI/ML training process to train an AI/ML component of the network apparatus to optimize at least one of the baseband signal processing components of the air interface, wherein training the AI/ML component comprises training the AI/ML component to optimize one or more baseband signal processing functions in a receive chain or a transmit chain of the network apparatus; and after the AI/ML component of the network apparatus is trained, use the trained AI/ML component to optimize one or more of the baseband signal processing functions in the receive chain or the transmit chain of the network apparatus for communication with the first device over the air interface.

19. The network apparatus of claim 18, wherein the information regarding an AI/ML capability of the first device comprises information indicating at least one of the following:

the first device is capable of supporting a type and/or level of complexity of AI/ML;

whether the first device assists with the AI/ML training process for optimization of the at least one air interface component; and at least one component of the at least one air interface component for which the first device supports AI/ML optimization.

20. The network apparatus of claim 19, wherein the information indicating at least one component of the at least one air interface component for which the first device supports AI/ML optimization further comprises information indicating whether the first device supports joint optimization of two or more components of the at least one air interface component.

21. The network apparatus of claim 18, wherein the one or more baseband signal processing components of the air interface includes at least one of a coding component, a modulation component and a waveform component.

\* \* \* \* \*